United States Patent [19]

Salsman et al.

[11] Patent Number: 5,065,098
[45] Date of Patent: Nov. 12, 1991

[54] SYSTEM FOR LOCATING CONCEALED UNDERGROUND OBJECTS USING DIGITAL FILTERING

[75] Inventors: Lloyd N. Salsman, El Reno, Okla.; Leslie D. Hoy, Knoxville, Tenn.

[73] Assignee: The Charles Machine Works, Inc., Perry, Okla.

[21] Appl. No.: 539,847

[22] Filed: Jun. 18, 1990

[51] Int. Cl.$^5$ .............................................. G01V 3/165
[52] U.S. Cl. ...................................... 324/326; 324/67
[58] Field of Search .................... 324/66, 67, 326–329

[56] References Cited

U.S. PATENT DOCUMENTS

| | | |
|---|---|---|
| 2,601,248 | 6/1952 | Brenholdt . |
| 3,900,878 | 8/1975 | Tsao . |
| 3,906,504 | 9/1975 | Guster et al. . |
| 3,975,735 | 8/1976 | McCullough et al. . |
| 4,039,938 | 8/1977 | Link . |
| 4,070,625 | 1/1978 | Harpster .......................... 324/67 X |
| 4,119,908 | 10/1978 | Cosman et al. ................... 324/67 X |
| 4,227,405 | 10/1980 | West . |
| 4,295,095 | 10/1981 | Thomas et al. . |
| 4,427,942 | 1/1984 | Sole . |
| 4,438,389 | 3/1984 | De Sa . |
| 4,491,785 | 1/1985 | Pecukonis ............................. 324/67 |
| 4,542,344 | 9/1985 | Darilek et al. ....................... 324/326 |
| 4,600,356 | 7/1986 | Bridges et al. . |
| 4,639,674 | 1/1987 | Rippingale . |
| 4,642,556 | 2/1987 | Pecukonis ............................. 324/67 |
| 4,652,861 | 3/1987 | Domes . |
| 4,691,165 | 9/1987 | Szedlmajer . |
| 4,709,213 | 11/1987 | Podhrasky ........................... 324/329 |
| 4,710,708 | 12/1987 | Rorden et al. . |
| 4,800,385 | 1/1989 | Yamazaki . |
| 4,806,869 | 2/1989 | Chau et al. . |
| 4,837,489 | 6/1989 | McFee . |
| 4,843,324 | 6/1989 | Humphreys, Jr. et al. . |
| 4,881,083 | 11/1989 | Chau et al. . |
| 4,896,117 | 1/1990 | Floweredew et al. . |

FOREIGN PATENT DOCUMENTS

| | | |
|---|---|---|
| 0246886A1 | 11/1987 | European Pat. Off. . |
| 0262882A2 | 4/1988 | European Pat. Off. . |
| 3836219A1 | 5/1989 | Fed. Rep. of Germany . |
| 2221621A | 7/1989 | United Kingdom . |

Primary Examiner—Kenneth A. Wieder
Assistant Examiner—W. S. Edmonds
Attorney, Agent, or Firm—Banner, Birch, McKie & Beckett

[57] ABSTRACT

A locating system has its performance enhanced by the use of digital filtering. The locating system may include a transmitter for transmitting an electromagnetic signal from a concealed object. The locating system may also use electromagnetic signals from existing electromagnetic sources unrelated to the locator system. A receiver is provided for receiving a selected electromagnetic signal. The signal is subsequently converted from an analog signal into a digital signal and subjected to digital filtering. The resulting digital signal is then processed to provide location information about the concealed object.

27 Claims, 56 Drawing Sheets

```
function y = p805szf (AO11, AO12, sect, fctr)
%Analog vs, digital comparison
%y = p805szf (AOx1, AOx2, sect, fctr)
% AOx1, AOx2 = Filter Coefficients for Section
% sect = Section # 1 or 2
% fctr = Nominal Center Frequency
fs = 78125;
n= 1024;
b1 = [1 0 -1];
a1 = [32768 -2*(AO11) - (AO12)]/32768;
[hh, hw] = freqz (b1,a1, n);
hydb=20*log10(abs(hh));
hfw=hw/pi*fs/2;
hold off
clg
plot (hfw,hydb-max(hydb))
hold on
[bs1, as1] = invfreqs (hh, hw,1,2);
hs = freqs (bs1,as1, hw);
hsbd=20*log10 (abs(hs));
plot (hfw, hsdb-max (hsdb))
grid
[y id] = max (hydb);
flo=table1([abs(hh(1:id))/abs(hh(id)),hfw(1:id)],[2^(1/2)/2]);
fhi=table1([abs(hh(id:length(hh)))/abs(hh(id)),hfw(id:length(hh))],...
[2*(1/2)/2]);
bw=fhi-flo;
fo=(fhi*flo)^(1/2);
g=fo/bw;
title (('Section #', int2str(sect) ' ', int2str(fctr), 'hz, Center Frequency
fprintf ('prn',',Section #%f  %f hz Center Frequency\n\n' , sect, fo)
fprintf ('prn',',Peak Amplitude: %f hz\n\n',hfw(id))
fprintf ('prn',',AOx1 %fAOx2 %f\n\n',AO11,AO12)
fprintf ('prn',',BW= %f, hz, q= %f, Sampling, Rate = %f\n\n',bw,q,fs)
fprintf ('prn',',%f + %f z(-1) + %f z(-2)\n', b1(1), b1(2), b1(3))
fprintf ('prn',',%f + %f z(-1) + %f z(-2)\n\n', a1(1), a1(2), a1(3))
fprintf ('prn',',%f s + %f\n', bs1(1), bs1(2))
fprintf ('prn',',%f s^2 + %f s + %f\n\n\n\n', as1(1), as1(2), as1(3))
```

FUNCTION "pso5ssf"

FIG. 7a

```
FUNCTION Y = p805szf (AO11, AO12, AO21, AO22, fctr)
%ANALOG vs, Digital Comparison
%y = p805szf (AQx1, AOx2, sect, fctr)
% AOx1, AOx2 = Filter Coefficients For Sections #1 & #2
% fctr = Nominal Center Frequency
fs = 78125;
n= 1024;
b1 = [1 0 -1];
a1 = [32768 -2*(AO11) - (AO12)]/32768;
a2 = [32768 -2*(AO21) - (AO22)]/32768;
b=conv (b1, b1);
a=conv (a1, a2);
[hh, hw] = freqz (b,a,n);
hydb=20*log10(abs(hh));
hfw=hw/pi*fs/2;
hold off
clg
plot (hfw,hydb-max(hydb))
hold on
[bs1, as1] = invfreqs (hh,hw,2,4);
hs = freqs (bs1,as1,hw);
hsdb=20*log10(abs(hs));
plot (hfw, hsdb-max (hsdb))
grid
[y id] = max (hydb);
flo=table1([abs(hh(1:id))/abs(hh(id)),hfw(1:id)],[2^(1/2)/2]);
fhi=table1([abs(hh(id:length(hh)))/abs(hh(id)),hfw(id:length(hh))],...
[2*(1/2)/2]);
bw=fhi-flo;
fo=(fhi*flo)^(1/2);
g=fo/bw;
title ([int2str(fctr), 'Hz, Center Frequency'])
fprintf ('prn',',%f Hz Center Frequency (Nominal)\n\n' , fctr)
fprintf ('prn',',%f Hz Center Frequency (Computed)\n\n' , fo)
fprintf ('prn',',Peak Amplitude: %f Hz\n\n',hfw(id))
fprintf ('prn',',AO11 %f, AO12 %f\n',AO11,AO12)
fprintf ('prn',',AO21 %f, AO22 %f\n\n',AO21,AO22)
fprintf ('prn',',BW= %f, Hz, Q= %f, Sampling, Rate = %f Hz\n\n',bw,q,fs)
fprintf ('prn',',%f + %f z(-1) + %f z(-2)', b(1), b(2), b(3))
fprintf ('prn',', + %f z(-3) + %f z(-4)\n', b(4), b(5))
fprintf ('prn',',%f + %f z(-1) + %f z(-2)', a(1), a(2), a(3))
fprintf ('prn',', + %f z(-3) + %f z(-4)\n\n', a(4), a(5))
fprintf ('prn',',%f s^2 + %f s + %f\n', bs1(1), bs1(2), bs1(3))
fprintf ('prn',',%f s^4 + %f s^3 + %f s^2', as1(1), as1(2), as1(3))
fprintf ('prn',',[ ' + %f s + %f\n\n',12, as1(4), as1(5))
```

FUNCTION "pso5f"  FIG. 7b

```
fs=73125;
nr=512;
fctr=8192;
fbw=100;
id=[ ]
while (length(id)==0)
    id=find(abs(fctr-73125/(2*nr)*(0:nr-1))<1);
   nr=nr-1;
end
n=nr+1;
fprintf ('Samples=%f\n',n)
AO11=25882;
AO12=-32702;
AO21=25885;
AO22=-32702;
b1=[1 0 -1];
a1=[32768 -2*AO11 -AO12]/32768;
b2=[1 0 -1];
a2=[32768 -2*AO11 -AO22]/32768;
b=conv(b1, b2);
a=conv(a1, a2);
[hh, hp] = freqz (b, a, n);
hy=abs (hh);
ff=hp/pi*fs/2;
[x, id]=max (hy);
y=ff (id);
idx=find(abs(ff-fctr)<fbw);
fpb=ff(idx);
clear hh hp ff x id y idx
pack
n=2048;
[hh, hp]=freqz (b, a, n);
hy=[abs(hpb);abs(hh)];
ff=[fpb;hp/pi*fs/2];
[ff,m idp]=sort (ff);
hy=hy(idp);
[x, id]=max(hy);
y=ff(id);
idx=find(abs(ff-fctr)<fbw);
plot(ff(idx)-fctr, 20*log10(hy(idx))-max(20*log10(hy(2:n))))
title([int2str(fctr), 'Hz Passband Response'])
grid
xlabel ([num2str(fctr), 'Hz Center Frequency'])
ylabel ('dB')
```

ROUTINE "PASSBAND ANALYZER"

FIG. 8

```
>> type p805coef.m function [A0x1, A0x2]=p805coef(fctr.q, fsmpl)
% Estimates Second Order Section Coefficients
% for P805 Filter
% A)x1, A0x2 Filter Coefficients
% fctr = Center Frequency
% q = Quality Factor
% fsmpl = Sampling Frequency
A0x1=fix(2*(1-1/q)*cos(2*pi*fctr/fsmpl)*16384);
A0x2=fix(-(1-1/q)^2*32768);

>>

>> [a011, a012]=p805coef(1171, 963, 78125)

a011 =

32588 a012 =

-32699

>> [a021, a022]=p805coef(1171, 992, 78125)

150.000000 Hz Center Frequency (Nominal)

152.733634 Hz Center Frequency (Computed)

Peak Amplitude: 152.587891 Hz

A011 32731.000000, A012 -32699.000000
A021 32732.000000, A022 -32701.000000

BW= 16.898028 Hz, Q= 9.038548, Sampling Rate= 78125.000000 Hz 1.000000 + 0.000000 z(-1) + -2.000000 z(-2) + 0.000000 z(-3) + 1.000000 z(-4)
1.000000 + -3.995544 z(-1) + 5.986943 z(-2) + -3.987253 z(-3) + 0.995854 z(-4)

*FIG. 12*

15950.000000 Hz Center Frequency (Nominal)

15349.949032 Hz Center Frequency (Computed)

Peak Amplitude: 15945.434570 Hz

A011 9349.000000, A012 -32702.000000
A021 9248.000000, A022 -32702.000000

BW= 42.414304 Hz, Q= 376.051177, Sampling Rate= 78125.000000 Hz 1.000000 + 0.000000 z(-1) + -2.000000 z(-2) + 0.000000 z(-3) + 1.000000 z(-4)
1.000000 + -1.135071. z(-1) + -2.318059 z(-2) + -1.132785 z(-3) + 0.995976 z(-4)

*FIG. 18b*

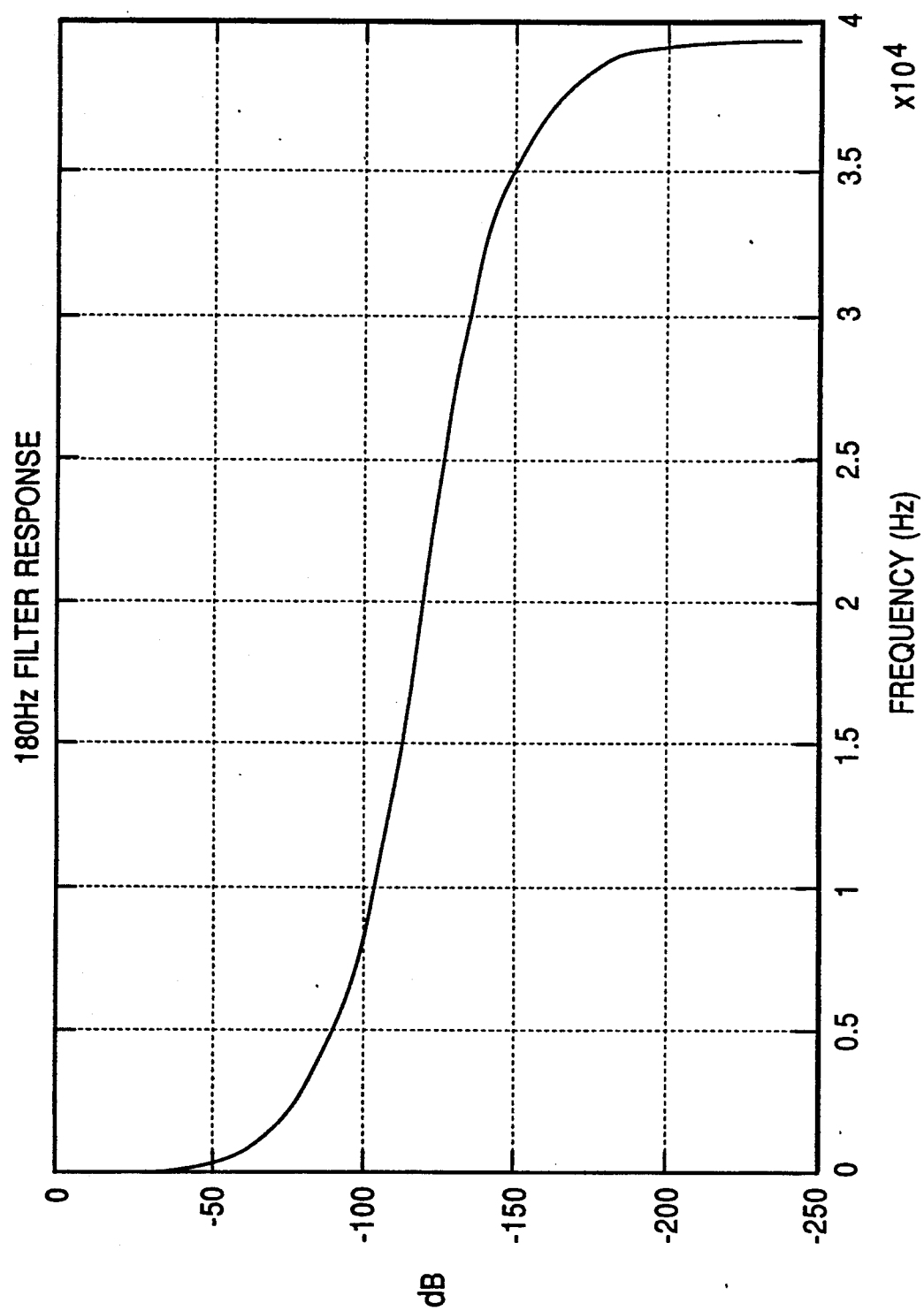

Section #1.000000 188.363978 Hz Center Frequency
Peak Amplitude: 190.734863 Hz
A0x1 32732.000000, A0x2 -32703.000000
BW= 36.963162 HX, Q= 5.095992, Sampling Rate = 78125.000000
1.000000 + 0.000000 z(-1) + -1.000000 z(-2)
1.000000 + -1.997803 z(-1) + -0.998016 z(-2)
$\left. \begin{array}{l} 0.560499\ s\ +\ 3.326678 \\ 1.000000\ s^\wedge 2\ +\ 1.866380\ s\ +\ 0.741428 \end{array} \right\}$ Poor Model Section #2.000000 188.294222 Hz Center Frequency
Peak Amplitude: 190.734863 Hz
A0x1 32731.000000, A0x2 -32701.000000
BW= 37.386060 HX, Q= 5.036482, Sampling Rate = 78125.000000
1.000000 + 0.000000 z(-1) + -1.000000 z(-2)
1.000000 + -1.997742 z(-1) + -0.997955 z(-2)
$\left. \begin{array}{l} 0.559016\ s\ +\ 3.377097 \\ 1.000000\ s^\wedge 2\ +\ 1.899252\ s\ +\ 0.745283 \end{array} \right\}$ Poor Model 180.000000 Hz Center Frequency (Nominal)
189.663170 Hz Center Frequency (Computed)
Peak Amplitude: 190.734863 Hz
A011 32732.000000, A012 -32703.000000
A021 32731.000000, A022 -32701.000000
BW= 26.605452 Hz, Q= 7.128733, Sampling Rate= 78125.000000 Hz
1.000000 + 0.000000 z(-1) + -2.000000 z(-2) + 0.000000 z(-3) + 1.000000 z(-4)
1.000000 + -3.995544. z(-1) + -5.987066 z(-2) + -3.987497 z(-3) + 0.995976 z(-4)
-5.708479 s^2 + 0.035386 s + -50.621108
1.000000 s^4 + 0.063422 s^3 + -12.660343 s^2 + -0.004508 s + -0.003008

*FIG. 15*

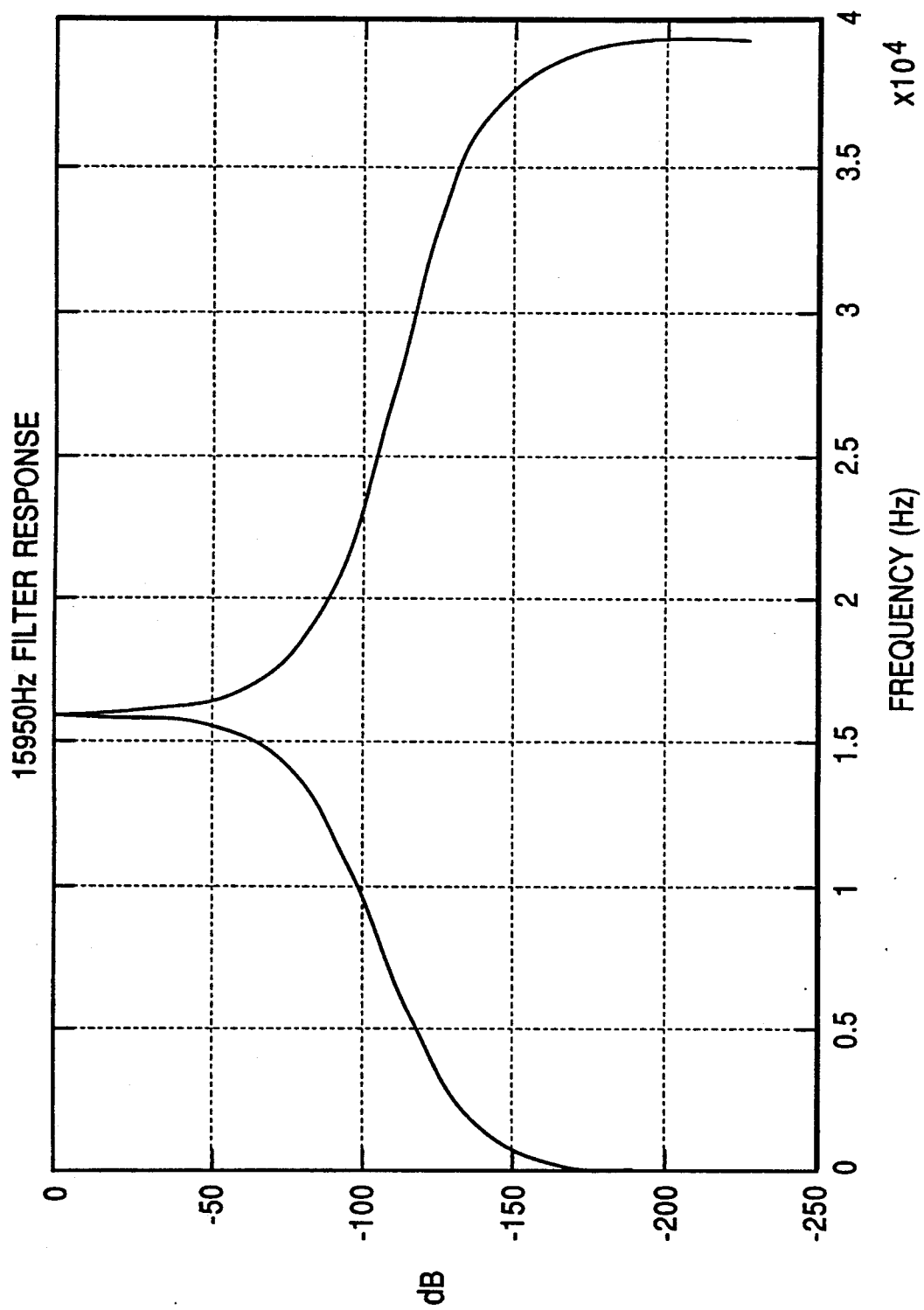

Section #1.000000 15932.981354 Hz Center Frequency
Peak Amplitude: 15945.464570 Hz
A0x1 9349.000000, A0x2 -32702.000000
BW= 60.641619 HX, Q= 262.733443, Sampling Rate = 78125.000000
1.000000 + 0.000000 z(-1) + -1.000000 z(-2)
1.000000 + -0.570618 z(-1) + -0.997986 z(-2)
1.044860 s + 0.000762
1.000000 s^2 + 0.001053 s + 1.642775

Section #2.000000 15975.252347 Hz Center Frequency
Peak Amplitude: 15983.581543 Hz
A0x1 9248.000000, A0x2 -32702.000000
BW= 50.850300 HX, Q= 314.162402, Sampling Rate = 78125.000000
1.000000 + 0.000000 z(-1) + -1.000000 z(-2)
1.000000 + -0.564453 z(-1) + -0.997986 z(-2)
1.045796 s + 0.000759
1.000000 s^2 + 0.001054 s + 1.651041

15950.000000 Hz Center Frequency (Nominal)
15949.237159 Hz Center Frequency (Computed)
Peak Amplitude: 15945.434570 Hz
A011 9349.000000, A012 -32702.000000
A021 9248.000000, A022 -32702.000000
BW= 40.988697 Hz, Q= 389.113056, Sampling Rate= 78125.000000 Hz
1.000000 + 0.000000 z(-1) + -2.000000 z(-2) + 0.000000 z(-3) + 1.000000 z(-4)
1.000000 + -1.135071. z(-1) + 2.318059 z(-2) + -1.132785 z(-3) + 0.995976 z(-4)
0.143553 s^2 + 0.004487 s + -4.353719
1.000000 s^4 + 0.002806 s^3 + 3.297077 s^2 + 0.004617 s + 2.717647

*FIG. 18a*

Section #1:000000 17777.176394 Hz Center Frequency
Peak Amplitude: 17776.489258 Hz
A0x1 4595.000000, A0x2 -32702.000000
BW= 33.272758 HX, Q= 534.286225, Sampling Rate = 78125.000000
1.000000 + 0.000000 z(-1) + -1.000000 z(-2)
1.000000 + -0.280457 z(-1) + -0.997986 z(-2)
1.094757 s + 0.000656
1.000000 s^2 + 0.001103 s + 2.045131

Section #2.000000 17815.772340 Hz Center Frequency
Peak Amplitude: 17814.636230 Hz
A0x1 4491.000000, A0x2 -32702.000000
BW= 34.259147 HX, Q= 520.029657, Sampling Rate = 78125.000000
1.000000 + 0.000000 z(-1) + -1.000000 z(-2)
1.000000 + -0.274109 z(-1) + -0.997986 z(-2)
1.095983 s + 0.000654
1.000000 s^2 + 0.001104 s + 2.054271

17800.000000 Hz Center Frequency (Nominal)
17798.692478 Hz Center Frequency (Computed)
Peak Amplitude: 17814.636230 Hz
A011 4595.000000, A012 -32702.000000
A021 4491.000000, A022 -32702.000000
BW= 59.547694 Hz, Q= 298.898097, Sampling Rate= 78125.000000 Hz
1.000000 + 0.000000 z(-1) + -2.000000 z(-2) + 0.000000 z(-3) + 1.000000 z(-4)
1.000000 + -0.554565. z(-1) + 2.072847 z(-2) + -0.553448 z(-3) + 0.995976 z(-4)
0.172756 s^2 + 0.003933 s + -4.704459
1.000000 s^4 + 0.002484 s^3 + 4.101731 s^2 + 0.005091 s + 4.206017

*FIG. 21*

Section #1.000000 18578.003967 Hz Center Frequency
Peak Amplitude: 18577.575684 Hz
A0x1 2502.000000, A0x2 -32702.000000
BW= 32.825562 HX, Q= 565.961485, Sampling Rate = 78125.000000
1.000000 + 0.000000 z(-1) + -1.000000 z(-2)
1.000000 + -0.152710 z(-1) + -0.997986 z(-2)
1.119078 s + 0.000621
1.000000 s^2 + 0.001127 s + 2.233177

Section #2.000000 18616.554894 Hz Center Frequency
Peak Amplitude: 18615.722656 Hz
A0x1 2397.000000, A0x2 -32702.000000
BW= 33.571905 HX, Q= 554.527816, Sampling Rate = 78125.000000
1.000000 + 0.000000 z(-1) + -1.000000 z(-2)
1.000000 + -0.146301 z(-1) + -0.997986 z(-2)
1.120400 s + 0.000620
1.000000 s^2 + 0.001128 s + 2.242726

18600.000000 Hz Center Frequency (Nominal)
18598.824153 Hz Center Frequency (Computed)
Peak Amplitude: 18615.722656 Hz
A011 2502.000000, A012 -32702.000000
A021 2397.000000, A022 -32702.000000
BW= 61.167421 Hz, Q= 304.064221, Sampling Rate= 78125.000000 Hz
1.000000 + 0.000000 z(-1) + -2.000000 z(-2) + 0.000000 z(-3) + 1.000000 z(-4)
1.000000 + -0.299011 z(-1) + 2.018313 z(-2) + -0.298409 z(-3) + 0.995976 z(-4)
0.188134 s^2 + 0.003742 s + -4.875596
1.000000 s^4 + 0.002382 s^3 + -4.478019 s^2 + -0.005331 s + 5.013129

*FIG. 24*

Section #1.000000 21379.089297 Hz Center Frequency
Peak Amplitude: 21362.304688 Hz
A0x1 -4849.000000, A0x2 -32702.000000
BW= 69.557205 HX, Q= 307.359809, Sampling Rate = 78125.000000
1.000000 + 0.000000 z(-1) + -1.000000 z(-2)
1.000000 + -0.295959 z(-1) + -0.997986 z(-2)
1.220715 s + 0.000533
1.000000 s^2 + 0.001229 s + 2.956546

Section #2.000000 21419.928624 Hz Center Frequency
Peak Amplitude: 21438.598633 Hz
A0x1 4953.000000, A0x2 -32702.000000
BW= 73.735701 HX, Q= 290.496032, Sampling Rate = 78125.000000
1.000000 + 0.000000 z(-1) + -1.000000 z(-2)
1.000000 + 0.302307 z(-1) + -0.997986 z(-2)
1.222353 s + 0.000532
1.000000 s^2 + 0.001231 s + 2.967701

21400.000000 Hz Center Frequency (Nominal)
21399.984461 Hz Center Frequency (Computed)
Peak Amplitude: 21400.451660 Hz
A011 -4849.000000, A012 -32702.000000
A021 -4953.000000, A022 -32702.000000
BW= 38.811574 Hz, Q= 551.381509, Sampling Rate= 78125.000000 Hz
1.000000 + 0.000000 z(-1) + -2.000000 z(-2) + 0.000000 z(-3) + 1.000000 z(-4)
1.000000 + 0.598267 z(-1) + 2.085442 z(-2) + 0.597062 z(-3) + 0.995976 z(-4)
0.258986 s^2 + 0.003235 s + -5.613457
1.000000 s^4 + 0.002169 s^3 + 5.926846 s^2 + 0.006424 s + 8.781831

FIG. 27a 21400.000000 Hz Center Frequency (Nominal)
21400.090357 Hz Center Frequency (Computed)
Peak Amplitude: 21400.840122 Hz
A011 -4849.000000, A012 -32702.000000
A021 -4953.000000, A022 -32702.000000
BW= 38.978389 Hz, Q= 549.024497, Sampling Rate= 78125.000000 Hz
1.000000 + 0.000000 z(-1) + -2.000000 z(-2) + 0.000000 z(-3) + 1.000000 z(-4)
1.000000 + 0.599257 z(-1) + 2.085442 z(-2) + 0.597062 z(-3) + 0.995976 z(-4)

FIG. 27b

Section #1.000000 23383.320389 Hz Center Frequency
Peak Amplitude: 23384.094238 Hz
A0x1 -9972.000000, A0x2  -32702.000000
BW= 33.415533 HX, Q= 699.773984, Sampling Rate = 78125.000000
1.000000 + 0.000000 z(-1) + -1.000000 z(-2)
1.000000 + 0.508643 z(-1) + -0.997986 z(-2)
1.311339 s + 0.000494
1.000000 s^2 + 0.001321 s + 3.535639

Section #2.000000 23421.839006 Hz Center Frequency
Peak Amplitude: 23422.241211 Hz
A0x1 -10072.000000, A0x2  -32702.000000
BW= 32.767451 HX, Q= 714.789784, Sampling Rate = 78125.000000
1.000000 + 0.000000 z(-1) + -1.000000 z(-2)
1.000000 + 0.614746 z(-1) + 0.997986 z(-2)
1.313310 s + 0.000493
1.000000 s^2 + 0.001323 s + 3.547638

23400.000000 Hz Center Frequency (Nominal)
23401.092686 Hz Center Frequency (Computed)
Peak Amplitude: 23384.094238 Hz
A011 -9972.000000, A012 -32702.000000
A021 -10072.000000, A022 -32702.000000
BW= 61.383294 Hz, Q= 381.229013, Sampling Rate= 78125.000000 Hz
1.000000 + 0.000000 z(-1) + -2.000000 z(-2) + 0.000000 z(-3) + 1.000000 z(-4)
1.000000 +1.223389 z(-1) + 2.370132 z(-2) + 1.220925 z(-3) + 0.995976 z(-4)
0.336083 s^2 + 0.002928 s + -6.281012
1.000000 s^4 + 0.002123 s^3 + 7.084793 s^2 + 0.007520 s + 12.548523

*FIG. 30a*

23400.000000 Hz Center Frequency (Nominal)
23401.092686 Hz Center Frequency (Computed)
Peak Amplitude: 23384.094238 Hz
A011 -9972.000000, A012 -32702.000000
A021 -10072.000000, A022 -32702.000000
BW= 61.383294 Hz, Q= 381.229013, Sampling Rate= 78125.000000 Hz
1.000000 + 0.000000 z(-1) + -2.000000 z(-2) + 0.000000 z(-3) + 1.000000 z(-4)
1.000000 +1.223389 z(-1) + 2.370132 z(-2) + 1.220925 z(-3) + 0.995976 z(-4)

*FIG. 30b*

Section #1:000000 23983.737729 Hz Center Frequency
Peak Amplitude: 23994.445801 Hz
A0x1 -11464.000000, A0x2 -32702.000000
BW= 55.941827 HX, Q= 428.726391, Sampling Rate = 78125.000000
1.000000 + 0.000000 z(-1) + -1.000000 z(-2)
1.000000 + 0.699707 z(-1) + -0.997986 z(-2)
1.342610 s + 0.000485
1.000000 s^2 + 0.001352 s + 3.719166

Section #2.000000 24026.473168 Hz Center Frequency
Peak Amplitude: 24032.592773 Hz
A0x1 -11563.000000, A0x2 -32702.000000
BW= 45.991383 HX, Q= 522.412493, Sampling Rate = 78125.000000
1.000000 + 0.000000 z(-1) + -1.000000 z(-2)
1.000000 + 0.705750 z(-1) + 0.997986 z(-2)
1.344704 s + 0.000485
1.000000 s^2 + 0.001354 s + 3.731724

240000.000000 Hz Center Frequency (Nominal)
23999.398440 Hz Center Frequency (Computed)
Peak Amplitude: 23994.445801 Hz
A011 -11464.000000, A012 -32702.000000
A021 -11563.000000, A022 -32702.000000
BW= 42.479142 Hz, Q= 564.968995, Sampling Rate= 78125.000000 Hz
1.000000 + 0.000000 z(-1) + -2.000000 z(-2) + 0.000000 z(-3) + 1.000000 z(-4)
1.000000 +1.405457 z(-1) + 2.489790 z(-2) + 1.402626 z(-3) + 0.995976 z(-4)
0.364743 s^2 + 0.002842 s + -6.519319
1.000000 s^4 + 0.002129 s^3 + 7.452974 s^2 + 0.007932 s + 13.886650

*FIG. 33a*

240000.000000 Hz Center Frequency (Nominal)
240000.008158 Hz Center Frequency (Computed)
Peak Amplitude: 23994.445801 Hz
A011 -11464.000000, A012 -32702.000000
A021 -11563.000000, A022 -32702.000000
BW= 43.699674 Hz, Q= 549.203373, Sampling Rate= 78125.000000 Hz
1.000000 + 0.000000 z(-1) + -2.000000 z(-2) + 0.000000 z(-3) + 1.000000 z(-4)
1.000000 +1.405457 z(-1) + 2.489790 z(-2) + 1.402626 z(-3) + 0.995976 z(-4)

*FIG. 33b*

Section #1.000000 11697.395104 Hz Center Frequency
Peak Amplitude: 11711.120605 Hz
A0x1 17428.000000, A0x2  -26542.000000
BW= 2601.211164 HX, Q= 4.496903, Sampling Rate = 78125.000000
$1.000000 + 0.000000\ z(-1) + -1.000000\ z(-2)$
$1.000000 + -1.063721\ z(-1) + -0.809998\ z(-2)$
$0.965276\ s + 0.147915$
$1.000000\ s^2 + 0.106417\ s + 1.084184$ Section #2.000000 13340.879928 Hz Center Frequency
Peak Amplitude:13351.440430 Hz
A0x1 14106.000000, A0x2  -26542.000000
BW= 2601.467710 HX, Q= 5.128213, Sampling Rate = 78125.000000
$1.000000 + 0.000000\ z(-1) + -1.000000\ z(-2)$
$1.000000 + -0.860962\ z(-1) + 0.809998\ z(-2)$
$1.005052\ s + 0.117394$
$1.000000\ s^2 + 0.104319\ s + 1.313349$ 12500.000000 Hz Center Frequency (Nominal)
12549.506573 Hz Center Frequency (Computed)
Peak Amplitude: 12626.647949 Hz
A011 17428.000000, A012 -26542.000000
A021 14106.000000, A022 -26542.000000
BW= 2486.014320 Hz, Q= 5.048043, Sampling Rate= 78125.000000 Hz
$1.000000 + 0.000000\ z(-1) + -2.000000\ z(-2) + 0.000000\ z(-3) + 1.000000\ z(-4)$
$1.000000 + -1.924683\ z(-1) + 2.535818\ z(-2) + -1.558988\ z(-3) + 0.656096\ z(-4)$
$0.125390\ s^2 + 0.450621\ s + -3.488642$
$1.000000\ s^4 + 0.279117\ s^3 + 2.747104\ s^2 + 0.296641\ s + 1.734618$

*FIG. 36*

Section #1.000000 16647.164612 Hz Center Frequency
Peak Amplitude: 16670.227051 Hz
A0x1 6736.000000, A0x2 -26542.000000
BW= 2601.273827 HX, Q= 6.399620, Sampling Rate = 78125.000000
1.000000 + 0.000000 z(-1) + -1.000000 z(-2)
1.000000 + -0.411133 z(-1) + 0.809998 z(-2)
1.096073 s + 0.082756
1.000000 s^2 + 0.107667 s + 1.894609

Section #2.000000 18299.847755 Hz Center Frequency
Peak Amplitude:18348.693848 Hz
A0x1 2838.000000, A0x2 -26542.000000
BW= 2601.131644 HX, Q= 7.035341, Sampling Rate = 78125.000000
1.000000 + 0.000000 z(-1) + -1.000000 z(-2)
1.000000 + -0.173218 z(-1) + 0.809998 z(-2)
1.150225 s + 0.072685
1.000000 s^2 + 0.111570 s + 2.241427

17500.000000 Hz Center Frequency (Nominal)
17483.709341 Hz Center Frequency (Computed)
Peak Amplitude: 17547.607422 Hz
A011 6736.000000, A012 -26542.000000
A021 2838.000000, A022 -26542.000000
BW= 2502.717027 Hz, Q= 6.985891, Sampling Rate= 78125.000000 Hz
1.000000 + 0.000000 z(-1) + -2.000000 z(-2) + 0.000000 z(-3) + 1.000000 z(-4)
1.000000 + -0.584351 z(-1) + 1.691211 z(-2) + -0.473323 z(-3) + 0.656096 z(-4)
0.132910 s^2 + 0.368422 s + -4.833493
1.000000 s^4 + 0.225477 s^3 + 4.393913 s^2 + 0.456207 s + 4.686888

*FIG. 39*

Section #1.000000 21597.156617 Hz Center Frequency
Peak Amplitude: 21629.333496 Hz
A0x1 -5024.000000, A0x2  -26542.000000
BW= 2601.560255 HX, Q= 8.301617, Sampling Rate = 78125.000000
1.000000 + 0.000000 z(-1) + -1.000000 z(-2)
1.000000 + 0.306641 z(-1) + 0.80998 z(-2)
1.283580 s + 0.060160
1.000000 s^2 + 0.122860 s + 3.040786

Section #2.000000 23250.508614 Hz Center Frequency
Peak Amplitude: 23307.800293 Hz
A0x1 -8870.000000, A0x2  -26542.000000
BW= 2601.0880441 HX, Q= 8.938763, Sampling Rate = 78125.000000
1.000000 + 0.000000 z(-1) + -1.000000 z(-2)
1.000000 + 0.541382 z(-1) + 0.809998 z(-2)
1.367237 s + 0.056363
1.000000 s^2 + 0.130397 s + 3.494762

22500.000000 Hz Center Frequency (Nominal)
22417.016542 Hz Center Frequency (Computed)
Peak Amplitude: 22430.419922 Hz
A011 -5024.000000, A012 -26542.000000
A021 -8870.000000, A022 -26542.000000
BW= 2504.839387 Hz, Q= 8.949483, Sampling Rate= 78125.000000 Hz
1.000000 + 0.000000 z(-1) + -2.000000 z(-2) + 0.000000 z(-3) + 1.000000 z(-4)
1.000000 + 0.848022 z(-1) + 1.786005 z(-2) + 0.686896 z(-3) + 0.656096 z(-4)
0.249859 s^2 + 0.313559 s + --6.289959
1.000000 s^4 + 0.198465 s^3 + 6.738793 s^2 + 0.653881 s + 11.176858

*FIG. 42*

Section #1.000000 26540.390187 Hz Center Frequency
Peak Amplitude: 26626.586914 Hz
A0x1 -15997.000000, A0x2 -26542.000000
BW= 2601.253716 HX, Q= 10.202883, Sampling Rate = 78125.000000
1.000000 + 0.000000 z(-1) + -1.000000 z(-2)
1.000000 + 0.976379 z(-1) + 0.809998 z(-2)
1.581953 s + 0.051974
1.000000 s^2 + 0.150226 s + 4.504173

Section #2.000000 28183.649675 Hz Center Frequency
Peak Amplitude: 28266.906738 Hz
A0x1 -19170.000000, A0x2 -26542.000000
BW= 2601.108547 HX, Q= 10.835245, Sampling Rate = 78125.000000
1.000000 + 0.000000 z(-1) + -1.000000 z(-2)
1.000000 + 1.170044 z(-1) + 0.809998 z(-2)
1.722708 s + 0.050935
1.000000 s^2 + 0.163374 s + 5.062604

27500.000000 Hz Center Frequency (Nominal)
27335.795502 Hz Center Frequency (Computed)
Peak Amplitude: 27351.379395 Hz
A011 -15997.000000, A012 -26542.000000
A021 -19170.000000, A022 -26542.000000
BW= 2491.381919 Hz, Q= 10.972142, Sampling Rate= 78125.000000 Hz
1.000000 + 0.000000 z(-1) + -2.000000 z(-2) + 0.000000 z(-3) + 1.000000 z(-4)
1.000000 + 2.146423 z(-1) + 2.762402 z(-2) + 1.738598 z(-3) + 0.656096 z(-4)
0.556795 s^2 + 0.250917 s + -8.539160
1.000000 s^4 + 0.211454 s^3 + 9.670667 s^2 + 1.030339 s + 23.132680

*FIG. 45*

Section #1.000000 33038.508234 Hz Center Frequency
Peak Amplitude: 33187.966211 Hz
A0x1 -26415.000000, A0x2 -26542.000000
BW= 2601.146324 HX, Q= 12.701519, Sampling Rate = 78125.000000
1.000000 + 0.000000 z(-1) + -1.000000 z(-2)
1.000000 + 1.612244 z(-1) + 0.809998 z(-2)
2.387014 s + 0.049766
1.000000 s^2 + 0.225853 s + 6.953854

Section #2.000000 31439.748663 Hz Center Frequency
Peak Amplitude: 31547.546387 Hz
A0x1 -24425.000000, A0x2 -26542.000000
BW= 2601.466617 HX, Q= 12.085394, Sampling Rate = 78125.000000
1.000000 + 0.000000 z(-1) + -1.000000 z(-2)
1.000000 + 1.490784 z(-1) + 0.809998 z(-2)
2.110018 s + 0.050186
1.000000 s^2 + 0.199751 s +6.285842

32500.000000 Hz Center Frequency (Nominal)
32182.823198 Hz Center Frequency (Computed)
Peak Amplitude: 32157.897949 Hz
A011 -26415.000000, A012 -26542.000000
A021 -24425.000000, A022 -26542.000000
BW= 2431.934614 Hz, Q= 13.233425, Sampling Rate= 78125.000000 Hz
1.000000 + 0.000000 z(-1) + -2.000000 z(-2) + 0.000000 z(-3) + 1.000000 z(-4)
1.000000 + 3.103027 z(-1) + 4.023502 z(-2) + 2.513445 z(-3) + 0.656096 z(-4)
1.510441 s^2 + -0.061452 s + -12.203586
1.000000 s^4 + 0.294393 s^3 + 13.105636 s^2 + 1.981740 s + 42.552824

*FIG. 48*

Section #1.000000 37057.770546 Hz Center Frequency
Peak Amplitude: 37574.768066 Hz
A0x1 -29440.000000, A0x2 -26542.000000
BW= 2601.024151 HX, Q= 14.247377, Sampling Rate = 78125.000000
$1.000000 + 0.000000\ z(-1) + -1.000000\ z(-2)$
$1.000000 + 1.796875\ z(-1) + 0.809998\ z(-2)$
$3.927505\ s + 0.030983$
$1.000000\ s^2 + 0.372037\ s + 9.096255$ Section #2.000000 36022.805292 Hz Center Frequency
Peak Amplitude: 36354.064941 Hz
A0x1 -28945.000000, A0x2 -26542.000000
BW= 2601.484112 HX, Q= 13.847021, Sampling Rate = 78125.000000
$1.000000 + 0.000000\ z(-1) + -1.000000\ z(-2)$
$1.000000 + 1.766663\ z(-1) + 0.809998\ z(-2)$
$3.277668\ s + 0.042881$
$1.000000\ s^2 + 0.310139\ s + 8.410931$ 37500.000000 Hz Center Frequency (Nominal)
36559.297651 Hz Center Frequency (Computed)
Peak Amplitude: 36659.240723 Hz
A011 -29440.000000, A012 -26542.000000
A021 -28945.000000, A022 -26542.000000
BW= 2013.475143 Hz, Q= 18.157313, Sampling Rate= 78125.000000 Hz
$1.000000 + 0.000000\ z(-1) + -2.000000\ z(-2) + 0.000000\ z(-3) + 1.000000\ z(-4)$
$1.000000 + 3.583538\ z(-1) + 4.794467\ z(-2) + 2.886457\ z(-3) + 0.656096\ z(-4)$
$6.706586\ s^2 + -2.412204\ s + -15.791685$
$1.000000\ s^4 + 0.644492\ s^3 + 16.926208\ s^2 + 5.600033\ s + 70.903024$

*FIG. 51*

Section #1.000000 1177.283099 Hz Center Frequency
Peak Amplitude: 1182.556152 Hz
A0x1 32589.000000, A0x2  -32700.000000
BW= 44.238838 HX, Q= 26.611980, Sampling Rate = 78125.000000
$1.000000 + 0.000000\ z(-1) + -1.000000\ z(-2)$
$1.000000 +-1.989075\ z(-1) + 0.997925\ z(-2)$
$0.827188\ s + 0.119670$
$1.000000\ s^2 + 0.017741\ s + 0.117349$ Section #2.000000 1177.404869 Hz Center Frequency
Peak Amplitude: 1182.556152 Hz
A0x1 32590.000000, A0x2  -32702.000000
BW= 43.758589 HX, Q= 26.906829, Sampling Rate = 78125.000000
$1.000000 + 0.000000\ z(-1) + -1.000000\ z(-2)$
$1.000000 + -1.989136\ z(-1) + 0.997986\ z(-2)$
$0.827965\ s + 0.116004$
$1.000000\ s^2 + 0.016950\ s + 0.115377$ 1170.000000 Hz Center Frequency (Nominal)
1180.279595 Hz Center Frequency (Computed)
Peak Amplitude: 1182.536152 Hz
A011 32589.000000, A012 -32700.000000
A021 32590.000000, A022 -32702.000000
BW= 29.681524 Hz, Q= 39.764791, Sampling Rate= 78125.000000 Hz
$1.000000 + 0.000000\ z(-1) + -2.000000\ z(-2) + 0.000000\ z(-3) + 1.000000\ z(-4)$
$1.000000 + -3.978210\ z(-1) + 5.952450\ z(-2) + -3.970076\ z(-3) + 0.995915\ z(-4)$
$-98.703717\ s^2 + 2.032291\ s + -829.906812$
$1.000000\ s^4 + 3.479152\ s^3 + -230.101171\ s^2 + 0.019533\ s + -2.069526$

*FIG. 53*

Section #1.000000 8011.067753 Hz Center Frequency
Peak Amplitude: 8010.864258 Hz
A0x1 26171.000000, A0x2 -32702.000000
BW= 32.568326 HX, Q= 245.977266, Sampling Rate = 78125.000000
1.000000 + 0.000000 z(-1) + -1.000000 z(-2)
1.000000 + -1.597351 z(-1) + 0.997986 z(-2)
0.911289 s + 0.002435
1.000000 s^2 + 0.000923 s + 0.417723

Section #2.000000 8010.381185 Hz Center Frequency
Peak Amplitude: 8010.864258 Hz
A0x1 26177.000000, A0x2 -32702.000000
BW= 32.893184 HX, Q= 243.527080, Sampling Rate = 78125.000000
1.000000 + 0.000000 z(-1) + -1.000000 z(-2)
1.000000 + -1.597717 z(-1) + 0.997986 z(-2)
0.911084 s + 0.002438
1.000000 s^2 + 0.000924 s + 0.417504

8010.000000 Hz Center Frequency (Nominal)
8010.812148 Hz Center Frequency (Computed)
Peak Amplitude: 8010.864258 Hz
A011 26171.000000, A012 -32702.000000
A021 26177.000000, A022 -32702.000000
BW= 24.836150 Hz, Q= 322.546458, Sampling Rate= 78125.000000 Hz
1.000000 + 0.000000 z(-1) + -2.000000 z(-2) + 0.000000 z(-3) + 1.000000 z(-4)
1.000000 + -3.195068 z(-1) + 4.548087 z(-2) + -3.188633 z(-3) + 0.995976 z(-4)
0.089183 s^2 + 0.012985 s + -3.373727
1.000000 s^4 + 0.008166 s^3 + 0.867312 s^2 + 0.003389 s + 0.187710

*FIG. 55*

Section #1.000000 29434.369366 Hz Center Frequency
Peak Amplitude: 29449.462891 Hz
A0x1 -23399.000000, A0x2 -32702.000000
BW= 65.582846 HX, Q= 448.812018, Sampling Rate = 78125.000000
1.000000 + 0.000000 z(-1) + -1.000000 z(-2)
1.000000 + 1.428162 z(-1) + 0.997986 z(-2) .
1.735301 s + 0.000446
1.000000 s^2 + 0.001748 s + 5.601612

Section #2.000000 29424.504901 Hz Center Frequency
Peak Amplitude: 29411.315918 Hz
A0x1 -23388.000000, A0x2 -32702.000000
BW= 61.312702 HX, Q= 478.348440, Sampling Rate = 78125.000000
1.000000 + 0.000000 z(-1) + -1.000000 z(-2)
1.000000 + 1.427490 z(-1) + 0.997986 z(-2)
1.734446 s + 0.000446
1.000000 s^2 + 0.001747 s + 5.599211

29430.000000 Hz Center Frequency (Nominal)
29429.258786 Hz Center Frequency (Computed)
Peak Amplitude: 29411.315918 Hz
A011 -23399.000000, A012 -32702.000000
A021 -23388.000000, A022 -32702.000000
BW= 62.174199 Hz, Q= 473.335549, Sampling Rate= 78125.000000 Hz
1.000000 + 0.000000 z(-1) + -2.000000 z(-2) + 0.000000 z(-3) + 1.000000 z(-4)
1.000000 + 2.855652 z(-1) + 4.034658 z(-2) + 2.849900 z(-3) + 0.995976 z(-4)
0.868621 s^2 + 0.001137 s + -9.492831
1.000000 s^4 + 0.002580 s^3 + 11.202227 s^2 + 0.014452 s + 31.372428

*FIG. 57*

SYSTEM FOR LOCATING CONCEALED UNDERGROUND OBJECTS USING DIGITAL FILTERING

TECHNICAL FIELD

The present invention generally relates to a system for use in determining the location and depth of concealed underground objects and more particularly to an improved locator system which uses a receiver that detects an electromagnetic signal radiated from a concealed object and processes that signal to determine object location and depth.

BACKGROUND OF THE INVENTION

A variety of devices are used to determine the location of concealed underground objects. Determining the location of such concealed objects as underground gas, sewer and water pipes, power cables, and telephone and CATV cables or conduits is a necessary prerequisite to excavation and/or laying of new lines, pipes or cables. For simplicity, these underground objects are hereinafter referred to as underground "lines."

In some applications, an underground steerable boring tool is utilized to form an underground tunnel through which underground lines are subsequently routed. While using a steerable boring tool, it is important for an operator to trace or keep track of the relative location of the existing lines with respect to the boring tool, in order to avoid contacting the existing lines with the tool. In other applications, a trench is excavated and the lines are subsequently placed in the open trench. While excavating these trenches, it is equally important for an operator to know the location of any existing lines in order to avoid contacting them with the excavating equipment.

Special purpose electromagnetic signal detector systems, which are commonly called "locator systems," have been used for many years to locate and/or trace the path of the boring tool or concealed underground lines. Various types of locator systems exist, but receivers that detect electromagnetic signals radiating from either the underground lines or a small transmitter located within the boring tool are by far the most widely used. Such radiated signals are generally produced in two ways: (1) an alternating current signal from a transmitting above ground source is induced into a conductive line which generates an electromagnetic field around the line, or (2) a signal is radiated from a small transmitter either mounted inside a boring tool or positioned within a non-conductive line.

Generally two types of signal sources will induce a current in a conductive line which, in turn, will generate an electromagnetic field around the line: active signal sources and passive signal sources. An example of a passive signal source in the locating environment is the signal radiated from a broadcast station. When such a signal encounters an exposed portion of a buried conductive line, the signal induces a current in the underground portion of a line, which generates an electromagnetic field around the line. Such a source is called a passive signal source, because it requires no operator intervention to generate the electromagnetic field. The problem with a passive signal source is that the same signal may be induced into many different lines, which complicates the operator's task of distinguishing between different lines.

Conversely, an active signal source is intentionally utilized by an operator to generate an electromagnetic field directly associated with the object to be traced. For example, an operator may couple a signal having a known frequency of up to approximately 150 kHz to an underground cable, for the purpose of generating a distinct electromagnetic field around the cable. The presence of the distinct electromagnetic field allows the operator to locate the cable and distinguish it from other cables with an above-ground receiver. Another example of an active signal source is a small, underground transmitter which may be installed in a boring tool or passed through a non-conductive line. A distinct signal radiated from the underground transmitter allows the operator to trace either the path of the boring tool or that of the non-conductive line.

Both passive and active sources may be used with the present invention. Each has its advantages. A key advantage of an active signal source is the capability of coupling a distinctive frequency signal into one conductive line, and distinguishing that particular line from adjacent or nearby lines. Consequently, the conductive line of interest can be traced with less confusion or interference from adjacent lines. Since the frequency of a coupled signal can be controlled very precisely, a very narrow bandwidth may be used for greater selectivity in the receiver. Also, the use of a narrow bandwidth improves the signal to noise ratio and increases the sensitivity of the receiver. The use of a narrow bandwidth in a locator system can be especially important for locating conductive lines in the vicinity of a strong radio transmitter, where the airborne signals can mask a subsurface signal unless the airborne signals are filtered out by the receiver's selective, narrowband circuitry. Another advantage of an active source is that the locator's calculations of the position and depth of underground conductive lines are not effected by electromagnetic field distortions from multiple signal sources to the same degree as they are with a passive signal source.

A passive source has the advantage that no transmitter is necessary. A receiver is all that is required. Thus, operation is simpler if a passive source is employed.

Assuming an active source is used, the practical way to couple a signal to an underground conductive line is simply to attach a wire directly from the transmitter to the line. Such a technique is illustrated in U.S. Pat. No. 4,387,340 to Peterman. If this approach is not feasible, it is also possible to attach the transmitter wire to a toroidal clamp, which is placed around the circumference of the line in order to induce a current into the line. Alternatively, if the signal cannot be readily coupled directly to the line because, for example, the line is completely buried, the signal can be coupled indirectly into the line by using a coil located in the transmitter and passing an alternating current signal through the coil. The electromagnetic field from the coil in the above-ground transmitter radiates through the earth and induces current in the buried line. The signal induced in the line is then re-radiated from the line and detected with a locator receiver.

As shown in Peterman, an active signal source is commonly used when an operator desires to locate and trace a specific underground line that is near numerous other lines. A distinctive frequency signal is coupled from a locator transmitter to the line to be traced. In such an embodiment, the transmitter generates a signal at a specific frequency. The locator receiver is manually tuned to the frequency of the transmitted signal. Thus, the receiver operator can thereby distinguish the particular line which is radiating the transmitted signal from the other, nearby lines which are not radiating the transmitted signal.

More specifically, FIG. 1 illustrates a perspective view of a conventional above ground locator system utilizing an active signal source. Transmitter 10 is positioned on the surface of earth 15 above buried line 20, which is the concealed object to be traced. Transmitter 10 output connector 12 is connected to a wire 18, which is in turn connected to conductive line 20. The connection of wire 18 to line 20 may be accomplished by directly attaching wire 18 to line 20, thus providing an electrical connection therebetween, or by connecting a toroidal clamp (not shown) to wire 18 and placing the clamp around line 20 to thereby induce the current. Thus, the output signal of transmitter 10, which is an AC continuous wave (CW) signal, is induced into line 20. Alternatively, if line 20 is buried to the extent that it is inaccessible by a wire attachment or toroidal clamp, the output signal is coupled to internal coil 11 in transmitter 10, which radiates an electromagnetic field corresponding to the CW signal. The radiated signal propagates through earth 15 and is induced into line 20. Consequently the output signal from transmitter 10, which is at a unique frequency, generates an electromagnetic field that radiates from line 20 with a field pattern 32 as illustrated in FIG. 2. Referring again to FIG. 1, receiver 30 is positioned on the surface 15 in the general vicinity of line 20 and manually tuned by an operator to the frequency of the transmitted signal. By sensing and processing the signal radiated from line 20, and using conventional locating techniques, the receiver operator locates the position of line 20 and traces the signal along the line's path.

FIG. 3 illustrates a perspective view of a conventional subsurface type active signal source locator transmitter which, in this case, is utilized for tracing the progress of a steerable, underground boring tool in order to avoid contacting existing lines with the tool. Referring to FIG. 3, transmitter 50 is placed within or closely behind boring tool 52. Transmitter 50 radiates a signal through earth 15 to above ground receiver 30. In response to location information provided by the receiver, an operator (not shown) of boring tool 52 rotates drill string 54 about its boring axis to control the direction of boring tool 52.

In another conventional application, it is sometimes required to detect and trace the paths of plastic or concrete underground pipes. Since these lines are non-conductive, there is no way to trace them by inducing an alternating current signal in them and detecting the radiated electromagnetic field. Consequently, a small subsurface transmitter is inserted into the plastic or concrete line, and the electromagnetic field radiated from the transmitter is detected by an above ground receiver and traced by an operator along the path of the line. Referring to FIG. 4, subsurface transmitter 60, which utilizes an active signal source, includes coil 62 which is wrapped around ferromagnetic rod 64. Coil 62 is energized with a closely controlled signal frequency by oscillator 66. Oscillator 66 is powered by an internal battery (not shown). Subsurface transmitter 60 is attached to rod 68 and pushed down the length of plastic or concrete line 65. Receiver 30 detects and processes the electromagnetic field radiated by transmitter 60. Consequently, a locator operator can trace the position of subsurface transmitter 60 as it is routed through line 65.

An example of a passive source is shown in FIG. 5. Broadcast station 61 transmits electromagnetic waves 62 which are coupled into line 59 through an exposed portion of the line 63. These electromagnetic waves are re-radiated from line 59 and detected by receiver 60. Thus, the location of underground line 59 may be ascertained.

Conventional locator systems are relatively inflexible and inefficient from an operational standpoint, because of their use of analog filters. These filters require factory tuning and are quite susceptible to damage in the field. Furthermore, the selectivity of the analog filters is quite limited, and this adversely affects their accuracy and performance.

SUMMARY OF THE INVENTION

Accordingly, it is an object of this invention to provide an improved locator system that transmits electromagnetic radiation from an underground source and receives and processes this information through digital filtering.

It is a further object of this invention to provide an improved receiver for use in an underground concealed object locating system, the improved receiver utilizing a digital filter.

It is yet further object of this invention to provide an improved locator system having improved sensitivity.

It is a yet further object of this invention to provide an improved locator system having improved versatility.

It is a yet further object of this invention to provide a method for selecting a digital filter for use in a locating system.

In accordance with the present invention an improved locator system is provided, including a receiver, which detects and processes a signal that radiates from an underground line. The receiver uses digital filtering to isolate the signal which was originally transmitted. The digital filtering provides a more selective system. Furthermore, digital filters do not require factory tuning and are less susceptible to damage in the field. Finally, the characteristics of digital filters may be changed by software. Thus, the filter characteristics can be altered without a major overhaul of the instrument.

In accordance with another embodiment of the present invention, a method is provided for selecting a digital filter for use in a locator system. The method includes the first step of choosing parameters for a digital filter, and a second step of doing a stabilization analysis of the resulting digital filter.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIGS. 7a, 7b, 8 and 9 are MATLAB listings used to choose and analyze the digital filters of the present invention.

FIGS. 10–17, 18a, 18b, 19–26, 27a, 27b, 28, 29, 30a, 30b, 31, 32, 33a, 33b, and 34–57 plot responses and list parameters of various digital filters in accordance with the present invention.

DETAILED DESCRIPTION OF THE PREFERRED EMBODIMENTS

Figure 1:
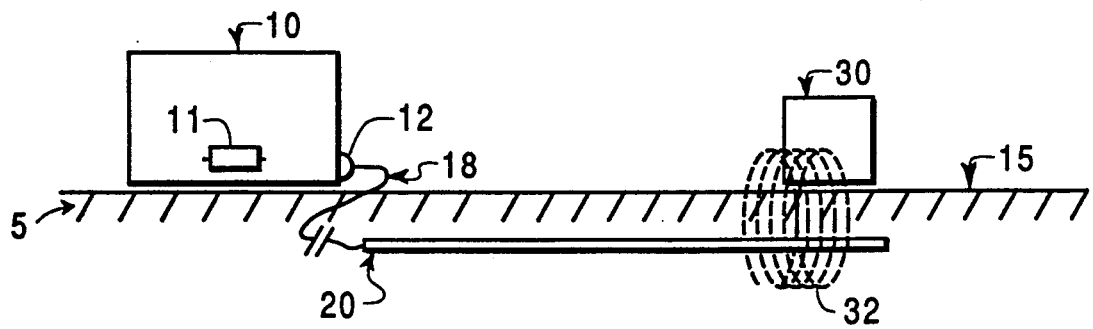
FIG. 1 illustrates a perspective view of a conventional above ground locator system for locating underground conductors.

According to the present invention an improved locator system is provided. A receiver is used for detecting electromagnetic waves radiated from a concealed object. The source of those waves may be either a transmitter used in conjunction with the receiver or it may be another source unrelated to the locating system, for example, a radio broadcast station. A transmitter which may be used in conjunction with the present invention is described in commonly assigned, co-pending applications entitled "Operator Interface for a System for Locating Concealed Underground Objects" Ser. No. 539,552, "An Improved System for Locating Concealed Underground Objects" Ser. No. 539,851; and "An Improved System for Locating Multiple Concealed Underground Objects" Ser. No. 539,616, the disclosures of which are expressly incorporated herein by reference thereto.

Thus, the receiver of the present invention operates in one of two modes: passive mode or active mode. In the passive mode, the receiver may operate in any one of three submodes. The submodes determine the frequencies to which the receiver is tuned, depending on the type of electromagnetic waves being detected. In the power submode, the receiver is preferably tuned to a frequency of either 150 Hz or 180 Hz. In this submode, the receiver is detecting leakage from power cables which generally operate at 50 Hz of 60 Hz. Almost all the power cables leak some energy, and this energy may be detected in order to determine the location of the conductor. It should be noted that the power cables therefore actually leak at their operating frequency, i.e. 50 Hz or 60 Hz. However, outside interference hampers performance if the receiver is tuned to those frequencies. Therefore, the receiver is preferably tuned to the third harmonic of those frequencies, 150 Hz and 180 Hz, respectively. Further, filter performance is better at these third harmonic frequencies.

In the radio narrowband submode, the receiver is tuned to one of six radio frequencies broadcast internationally. These radio frequencies, when broadcast from a station, are often coupled into underground cables, through an exposed portion. The waves are then re-radiated by the cable, and can be detected in order to determine the location of the cable.

In the radio wideband submode, the receiver is tuned to one of six bands of radio waves. Each band preferably falls between 10 kHz and 40 kHz and, in the preferred form, is 5 kHz wide. The radio wideband submode is used to detect radiation over a relatively wide area of the electromagnetic spectrum. Thus, it may be used to survey a location about which no prior information is available. However, the radio wideband submode is not very sensitive or very selective.

In the active mode, a source of electromagnetic waves is provided for the specific purpose of injecting those electromagnetic waves into the underground, concealed line. The transmitter used with the present invention emits one of three standard frequencies: 1.170 kHz, 8.010 kHz and 29.430 kHz. Filters tuned to these frequencies have a very narrow bandwidth and are very selective. Thus, they are very sensitive and provide a wide dynamic range.

Figure 6:
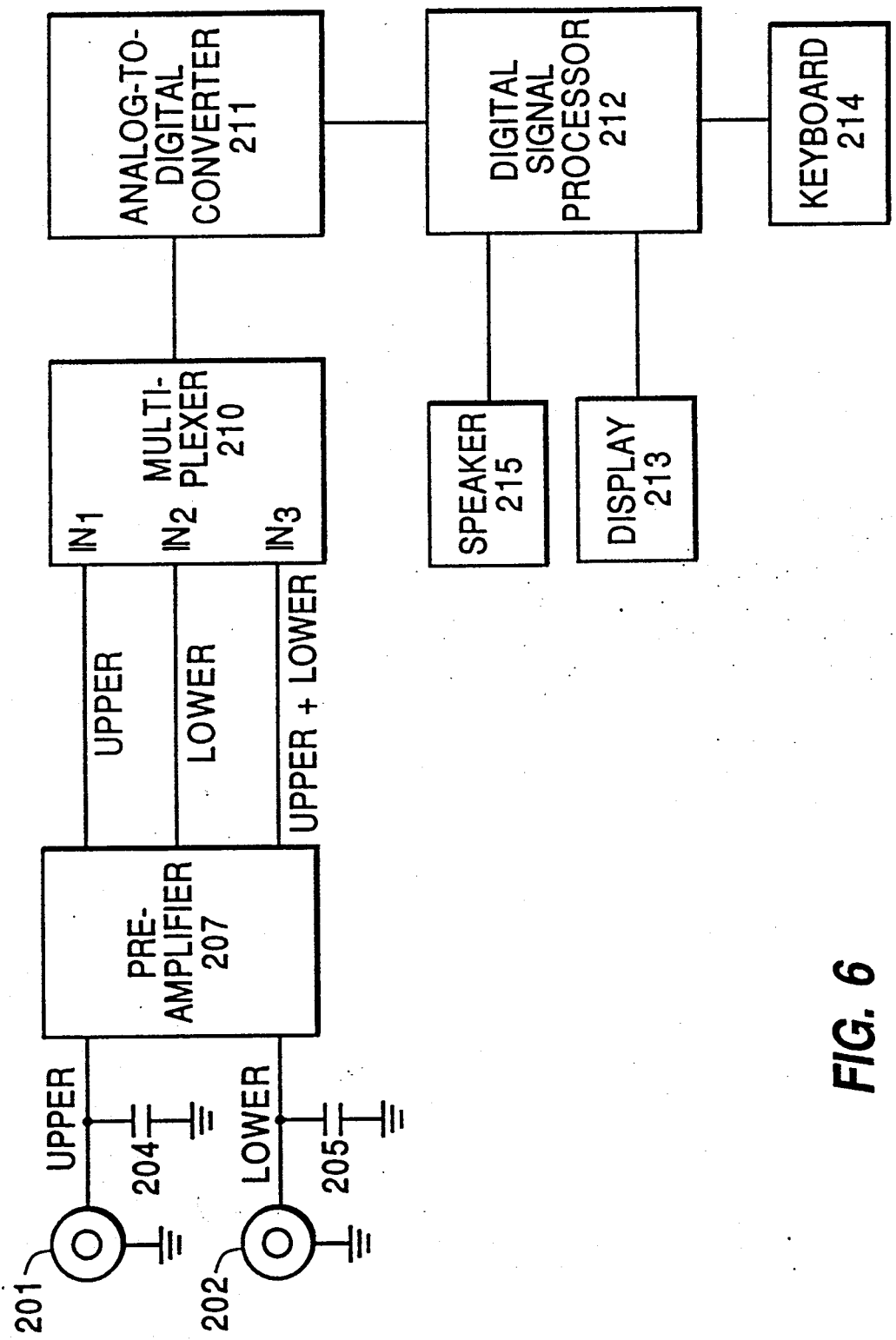
FIG. 6 is a block diagram of a receiver for use in a system for locating concealed underground objects according to the present invention.

FIG. 6 illustrates a block diagram of a receiver according to the invention. Two ferrite-loaded loop antennas 201 and 202 are used to receive signals from a transmitter (not shown in FIG. 6) as radiated by an underground line. The antennas 201 and 202 are arranged in an array to provide comparative amplitude information for line location information and line depth estimation. This allows the operator to determine both the location of the line and the depth of the line being traced. Furthermore, the use of an array provides a narrow beamwidth. The narrow beamwidth gives the antenna a directional characteristic. It is more sensitive to signals received from a given direction than to signals from other directions. The inductance represented by each of the antennas is resonated at a frequency less than the alias frequency with shunt capacitors 204 and 205. This action provides some protection from frequencies which lie above the desired detection band which may be folded into the detection band as an interfering signal. Resonating the antenna provides the function of an anti-aliasing filter and further serves a gain-matching purpose for depth measurement at higher frequencies. Furthermore, this technique reduces discrete sampling effects imposed on the antenna signals by the A/D conversion process to be described later.

Figure 4:
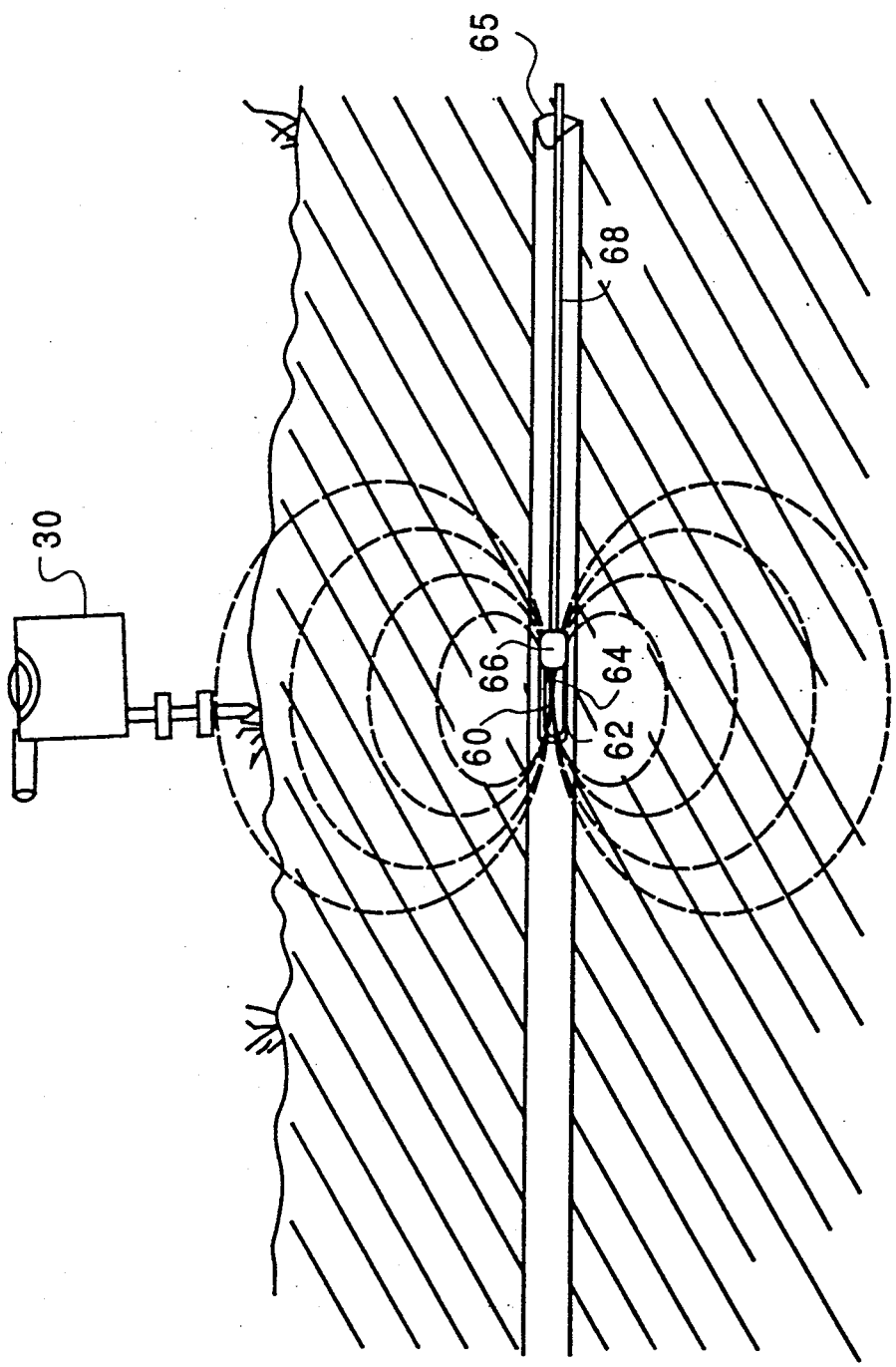
FIG. 4 illustrates a perspective view of a conventional locator system for locating a non-conductive underground object using a subsurface transmitter.

Each of the antennas 201 and 202 is separately tuned. The outputs of the antennas 201 and 202 in FIG. 4 are labeled "upper" and "lower", respectively.

The antenna elements 201 and 202 are connected to pre-amplifier 207. The multi-channel pre-amplifier 207 provides gain for the individual antenna elements and may be used to limit each antenna's bandwidth. An additional channel of the pre-amplifier is used for signal combination. In specific, signals from the upper and lower antennas are combined.

Gain and resonance adjustments are provided to coarsely balance the antenna channels at the different transmitted frequencies. This feature is used primarily for depth estimation by known techniques.

The outputs from pre-amplifier 207 are connected to the inputs of multiplexer 210. Multiplexer 210 selects one of the channels from pre-amplifier 207 to be processed at any given time based on the particular antenna operational mode chosen. The antenna operational modes include single antenna locating, dual antenna locating, and depth estimation. A later described microprocessor chooses the mode based on operator input.

The output of multiplexer 210 is connected to analog-to-digital converter 211. The A/D converter 211 is a 16 bit, dual channel device. The A/D converter 211 is provided to produce digitized data at the earliest possible point in the signal path. This minimizes noise and interference effects and maintains the dynamic range of the input signals.

The A/D converter 211 operates at 78,125 samples per second. This sampling rate is an important design parameter because, as a harmonic of the system clock, it minimizes converter induced interference. Further, this frequency minimizes harmonic interaction with a later described processor and DC-to-DC converter. Lastly, the filter frequencies are normalized using the sampling rate.

The digital output from A/D converter 211 is passed to digital signal processor 212. The digital signal processor 212 performs several functions. Most importantly, it executes the filtering and detection algorithms. Further, it controls the operator's keyboard and the operator's display. The display may be a basic four character display of setup parameters and operating mode, or may be a display which provides more information, such as described in the referenced co-pending applications. For example, the digital gain and detected signal level may be continuously displayed.

Digital signal processor 212 is a 16-bit device but its internal data paths are 32 bits wide for extended precision arithmetic. This extended precision is required to maintain stability in the filtering algorithm which uses 32-bit arithmetic. Furthermore, 32-bit precision preserves the dynamic range of the filtered signals. Digital signal processor 212 includes a microprocessor. An example of a microprocessor that may be used with the present invention is Texas Instrument's microprocessor model TMS320C25.

The digital signal processor 212 is interrupt-driven. Processing occurs only when data is presented to the digital signal processor 212 by A/D converter 211.

When a key is pressed on a keyboard 214, the filtering algorithms are ignored until the operator request can be satisfied. If there is no outstanding operator request, the filtering algorithms are processed continuously providing the operator with a continuous output.

A speaker 215 is provided to give an audible indication of the signal strength. Since this audible indication varies continuously depending on the receiver's proximity to the concealed object, the location of the concealed object can be pinpointed. An operator display 213 also is provided. Display 213, as described above, is driven by digital signal processor 212.

The keyboard 214 contains a plurality of keys for actuating various functions. These keys are interpreted by the digital signal processor software, which performs the requested function when the keyboard is activated.

The power is supplied to all components of the receiver by a battery. A DC-to-DC converter supplies power at appropriate voltage levels to the various components of the receiver. Battery status is monitored digitally by the digital signal processor 212. The digital signal processor issues an operator warning when the battery power decreases below a predetermined value. Optionally, the digital signal processor 212 can also display an estimate of battery life.

Figure 2:
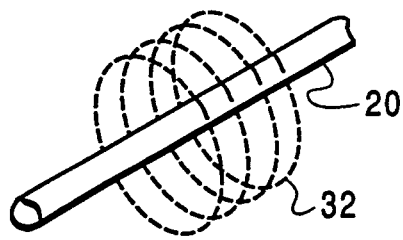
FIG. 2 illustrates the electromagnetic field produced by a current carrying conductor.
Figure 5:
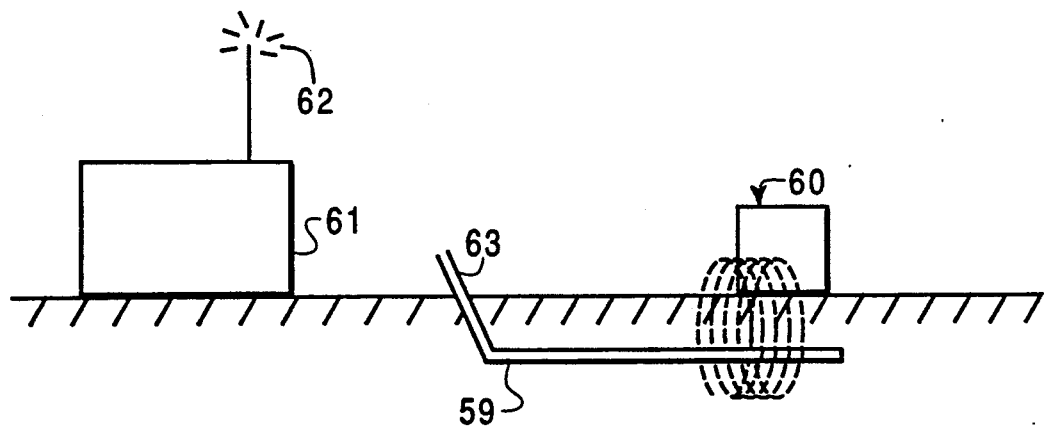
FIG. 5 illustrates a perspective view of a conventional locator system for locating a concealed underground object using a passive source of electromagnetic waves.
Figure 3:
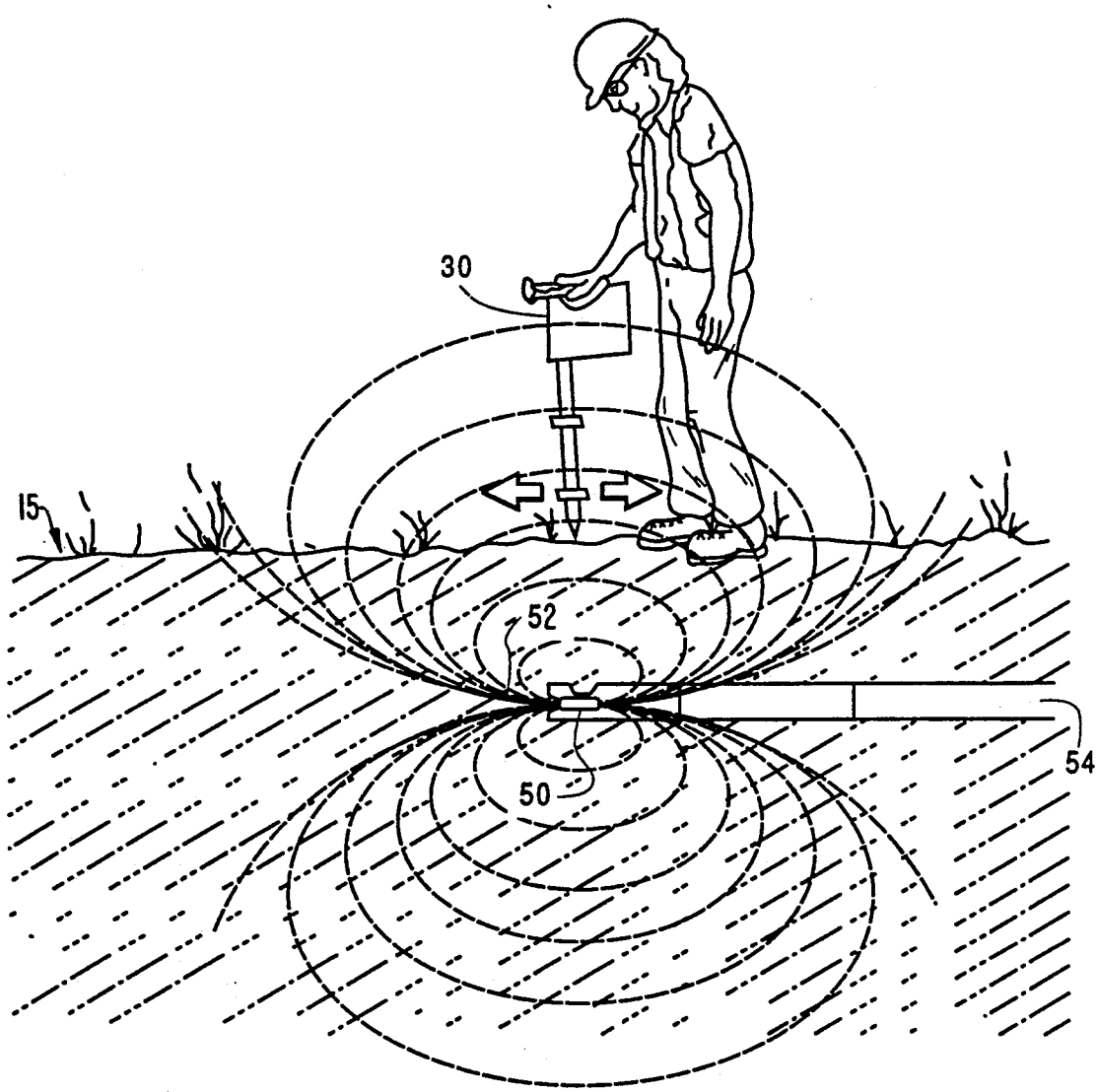
FIG. 3 illustrates a perspective view of a conventional locator system for locating a boring tool using a subsurface transmitter.

The details of the filter algorithm will now be discussed. The filter algorithm is composed of two, cascaded, second-order sections. Such a filter is shown in Rabiner, L. R. and Gold, B., *Theory and Applications of Digital Signal Processing*, (Englewood Cliffs, N.J.: Printice-Hall), p. 23, which is incorporated herein by reference. These sections are independently designed with a specific center frequency and bandwidth using known techniques. In particular, an algorithm for computing the characteristics of the filter is shown in FIG. 2.21 of Rabiner et al.

The digital filters are based on second-order polynominal ratios. An example of the design of a second-order section may be found in Press, W. H., et al., *Numerical Recipes, The Art of Scientific Computing*, 1988 (New York: Cambridge University Press), pp. 440–442, which is incorporated herein by reference.

The two-section cascade was implemented using 32-bit arithmetic with the appropriately scaled parameters for the filter characteristics. Parameters representing the filter characteristics are selected by the operator, and the those parameters are passed to the filter routine and applied to the incoming data. More specifics of choosing the filter characteristics are discussed below. The filter output is scaled and passed to a moving average detector stage.

The detected output is then re-scaled and output via a speaker. The output of the speaker is representative of the strength of the electromagnetic signal radiated from the concealed object. Therefore, the operator can pinpoint the location of the object.

There are various techniques of choosing, programming, and analyzing digital filter characteristics. The technique hereinafter described is for example only, and other known techniques may also be used.

The filters of the present invention were chosen and analyzed using functions called "P805SZF" and "P805F", listings of which are given in FIGS. 7a and 7b, respectively. Furthermore, the passband response of the filters was analyzed using another program. A listing of it is provided as FIG. 8. The listings are MATLAB programs. MATLAB is a trademark of The Math Works, Inc.

Function "P805SZF" estimates the individual filter section performance, plots the wideband or passband amplitude response, computes the nearest equivalent analog filter, and provides the transfer function for the sampled data filter. Function "P805F" estimates the combined response for the cascaded sections.

There are four important parameters used for selecting the digital filter for use in the present invention. They are as follows: AO11, AO12, AO21, and AO22. AO11 and AO12 are parameters for the first filter section, and AO21 and AO22 are parameters for the second filter section. The parameters are functions of the center frequency, the sampling rate and the quality factor. In specific, $$AOx1 = 2*(1-1/q)*\cos(2*pi*fctr/fsmpl)*16,384$$

and $$AOx2 = -(1-1/q)^2*32768$$

where

X equals 1 or 2 (depending on filter section being formed), q = quality factor, fctr = center frequency, and fsmpl = sampling frequency.

The quality factor q is not necessarily defined as the typical quality factor in circuit analysis. It is an experimentally determined quantity, chosen by trial and error based on filter performance.

A MATLAB listing of a program which performs this calculation is presented in FIG. 9. FIG. 9 also shows the actual output of the program, that is, coefficients based on the above formulae.

Once the filter parameters are determined, they are passed to function "p805f" which plots the filter characteristics and computes the "z" transfer function of the overall filter. Thus, the filter's performance can be evaluated.

After what appears to be a suitable filter has been determined in the above manner, a stabilization analysis must be done in order to complete the selection process. This stabilization analysis involves manually plotting the impulse response of the filter and observing how long it takes for the filter to stabilize. If the filter stabilizes in a time short enough in duration for the proposed use, then it is an acceptable filter. If not, another filter must be chosen by repeating the entire process. The stabilization analysis is subjective. The designer must decide how long the user can reasonably wait for results.

Examples of filter operation at various frequencies in various modes are shown in FIGS. 10–57. A description of each example now follows:

EXAMPLE 1

Figure 10:
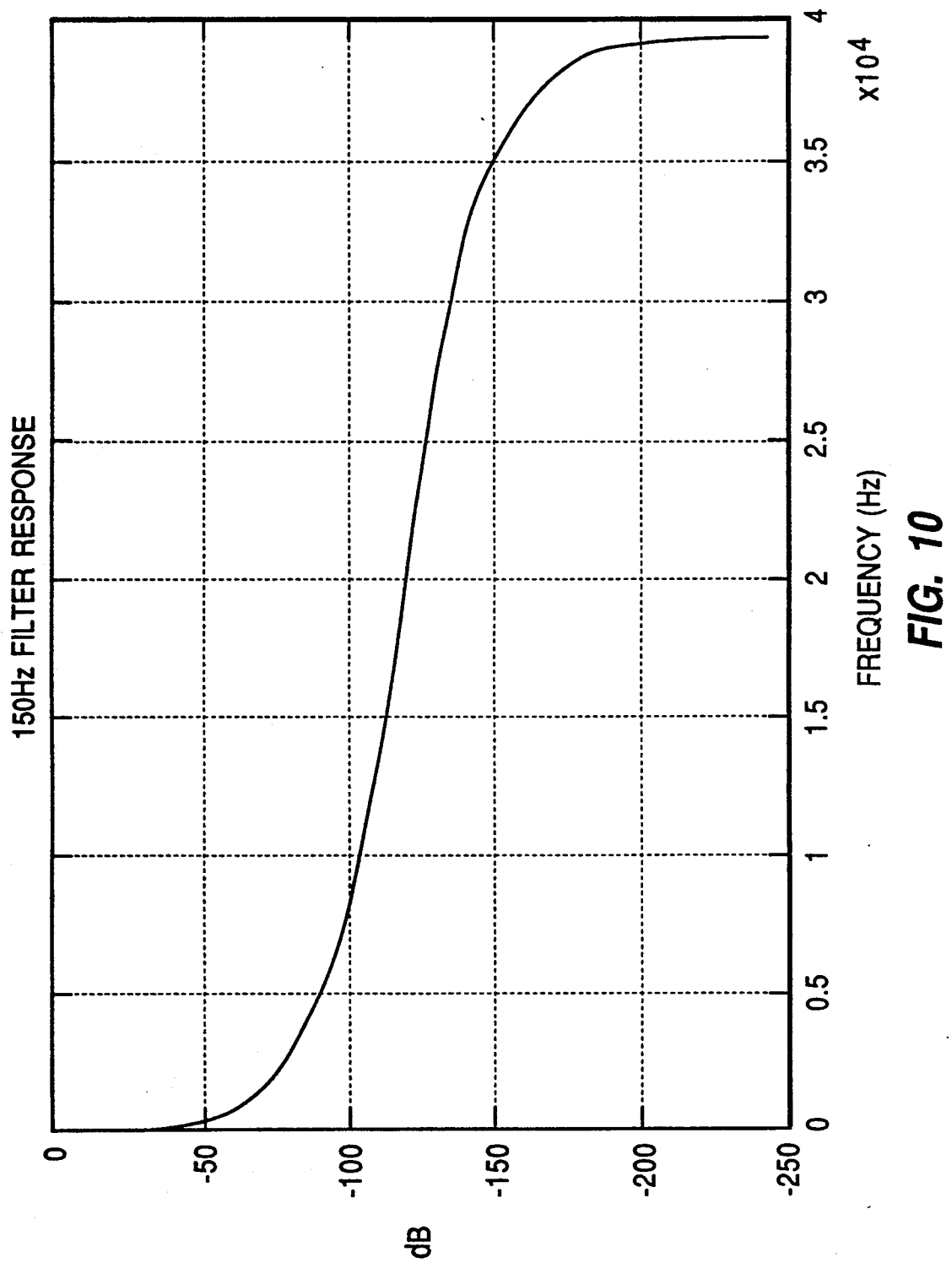
Figure 11:
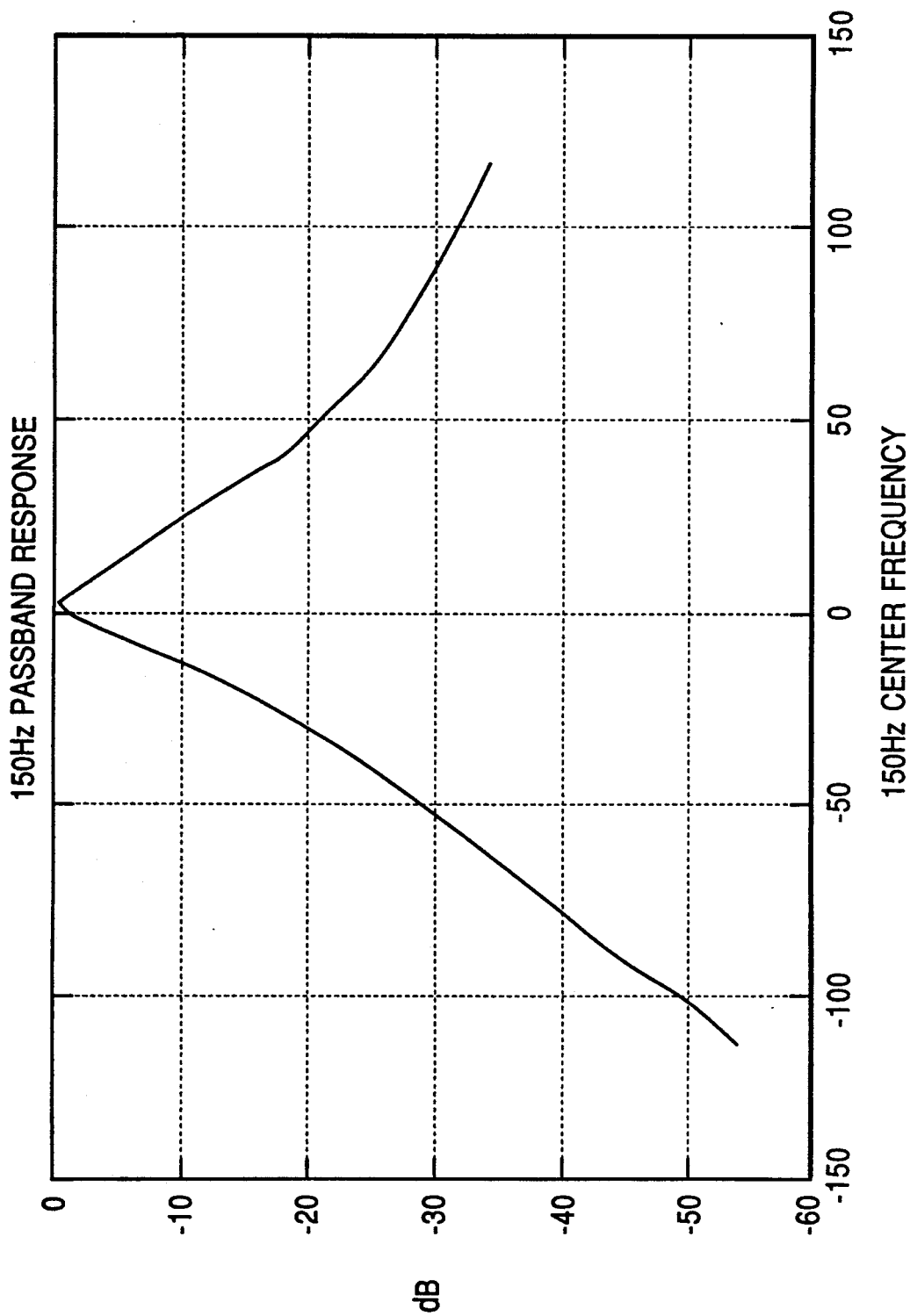

FIG. 10 illustrates the filter response when the receiver is in the passive mode at the power frequency of 50 Hz. The filter in this mode is actually tuned to a frequency of 150 Hz. This is because examining the 50 Hz signal has been found to be difficult because of interference. Examining the third harmonic has proved to yield better performance with less interference. FIG. 11 illustrates the passband response in the selected mode at the selected frequency. FIG. 12 is a printout of the output of the MATLAB function "p805f" showing the actual filter characteristics and coefficients in the selected mode at the selected frequency. As it seen from the printout $AO11=31731$, $AO12=-32689$, $AO21=32732$, and $AO22=-32701$. The bandwidth is 16.898028 and $q=9.038548$.

EXAMPLE 2

Figure 14:
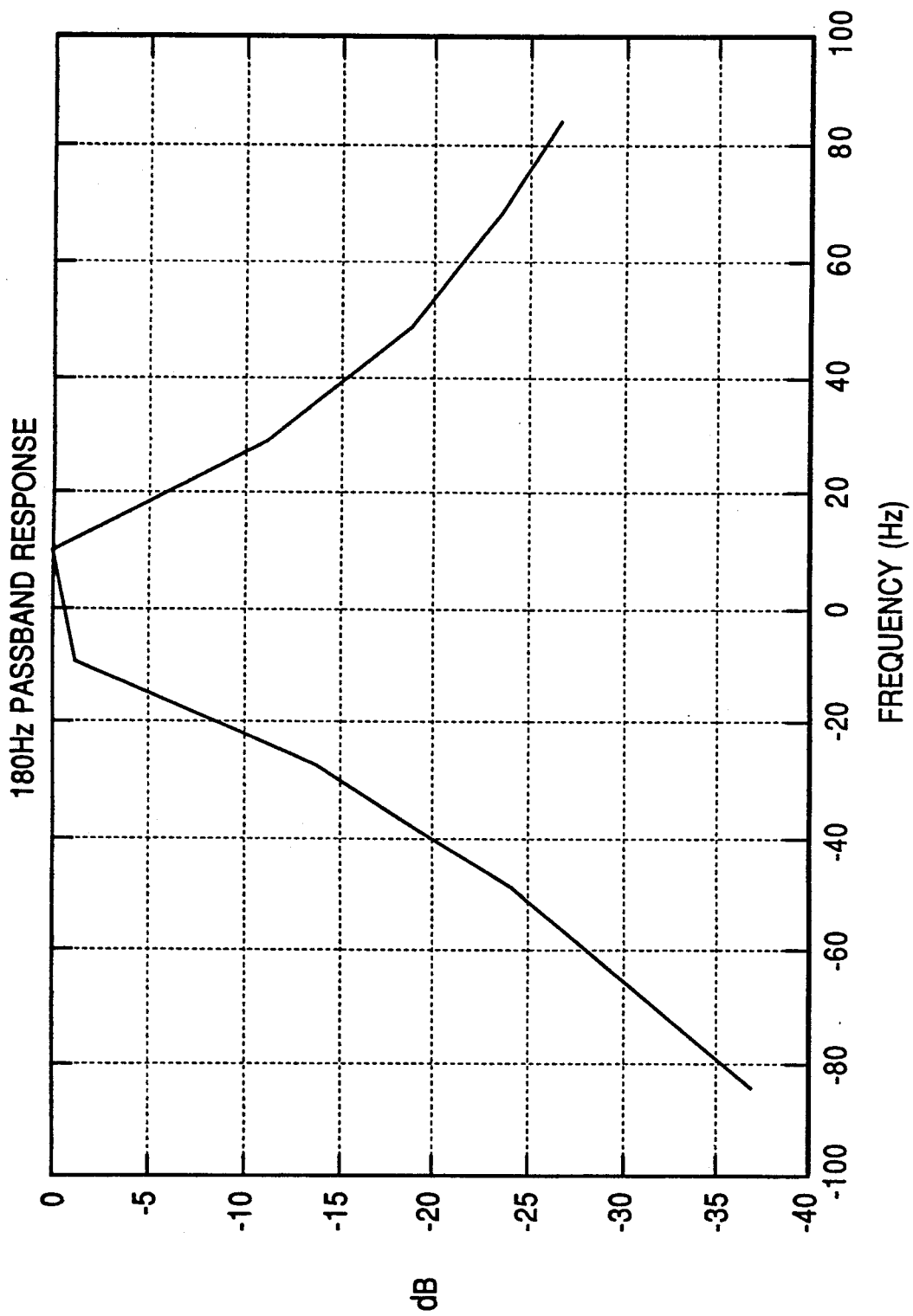

FIG. 13 illustrates the filter response when the receiver is in the passive mode at the power frequency of 60 Hz. Again, the filter is actually tuned to 180 Hz, the third harmonic of 60 Hz, in order to reduce interference effects and provide a better filter performance. FIG. 14 illustrates the passband response in the selected mode at the selected frequency. FIG. 15 is the printout of the output of the MATLAB function "p805f" showing the actual filter characteristics and coefficients in the selected mode at the selected frequency. Since the characteristics and coefficients are easily read off the printout, they will not be repeated here or in later examples.

EXAMPLE 3

Figure 17:
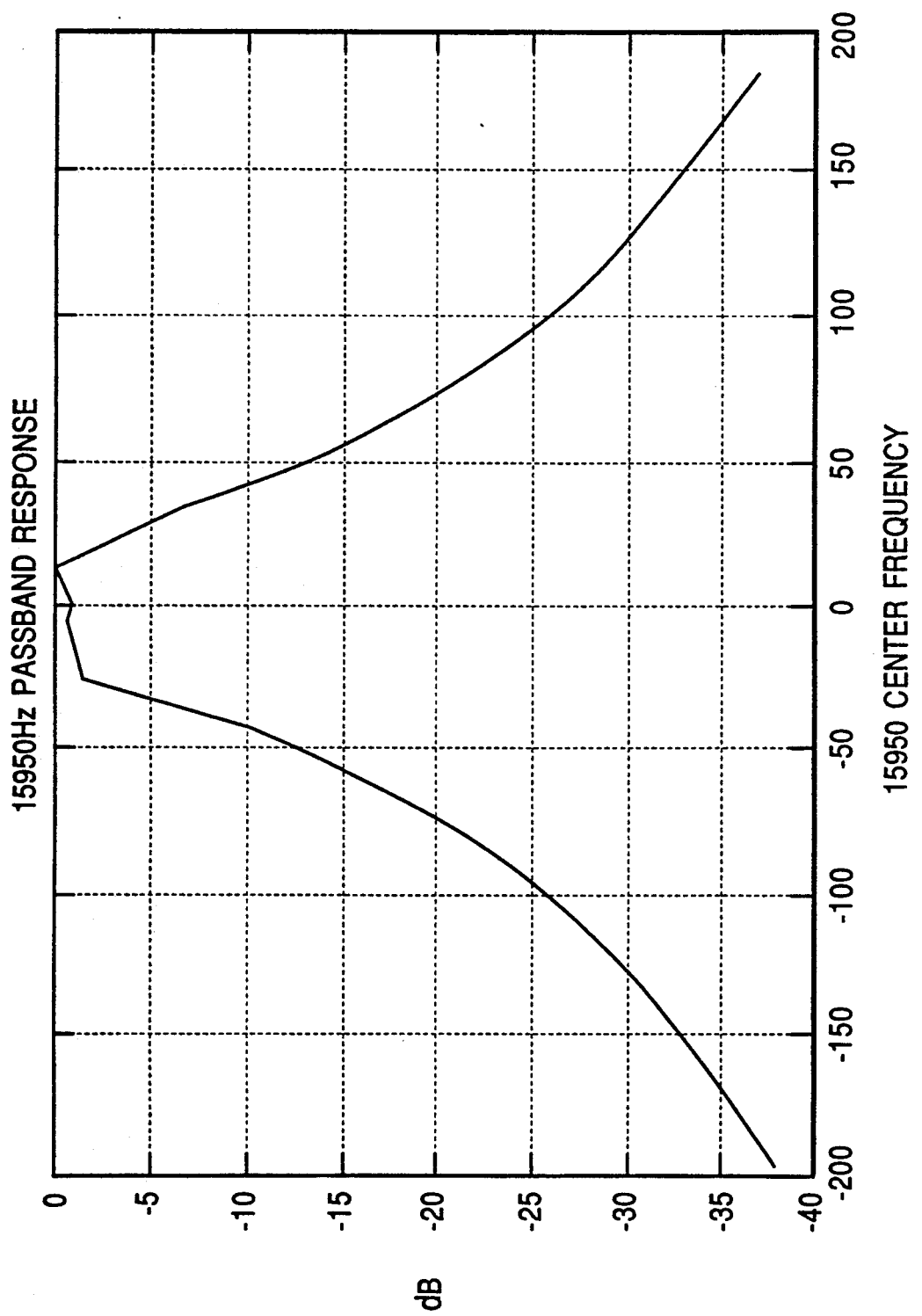

FIG. 16 illustrates the filter response when the receiver is in the passive mode at the radio narrowband frequency of 15,950 Hz. FIG. 17 illustrates the passband response in the selected mode at the selected frequency. FIGS. 18a and 18b are printouts of the output of the MATLAB function showing the filter characteristics and coefficients in the selected mode at the selected frequency.

EXAMPLE 4

Figure 19:
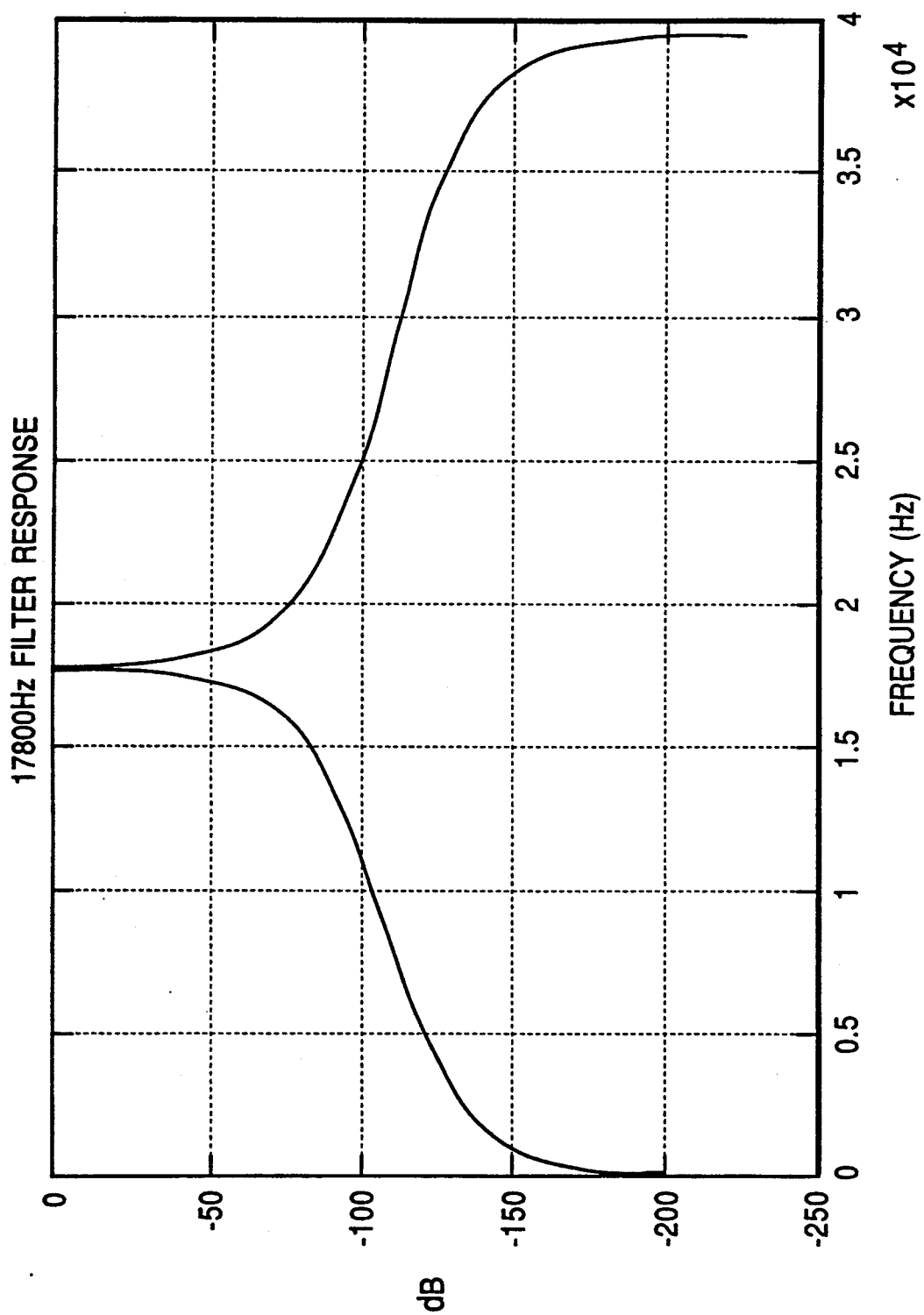
Figure 20:
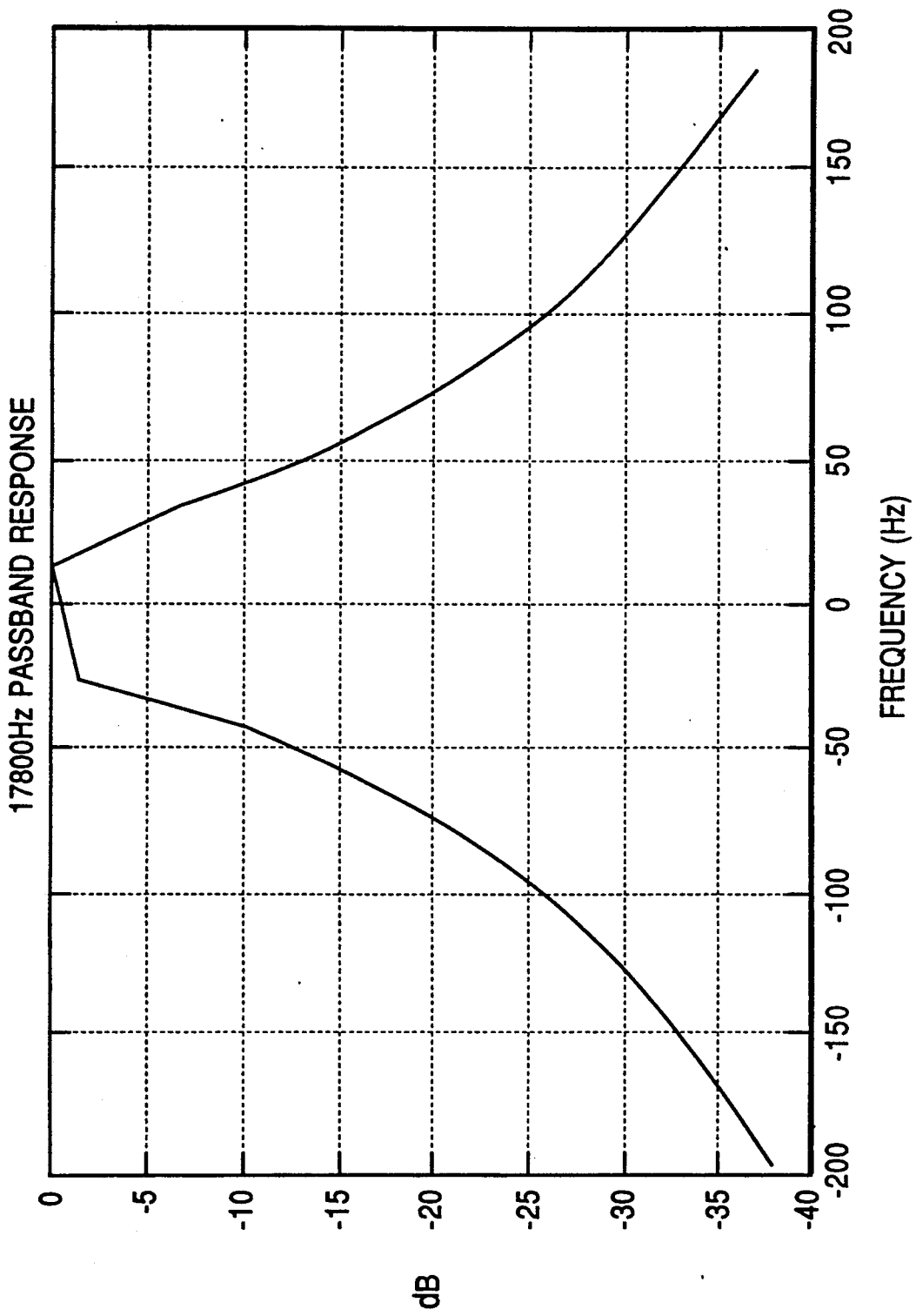

FIG. 19 illustrates the filter response when the receiver is in the passive mode at the radio narrowband frequency of 17,800 Hz. FIG. 20 illustrates the passband response in the selected mode at the selected frequency. FIG. 21 is a printout of the output of the MATLAB function showing filter characteristics and coefficients in the selected mode at the selected frequency.

EXAMPLE 5

Figure 22:
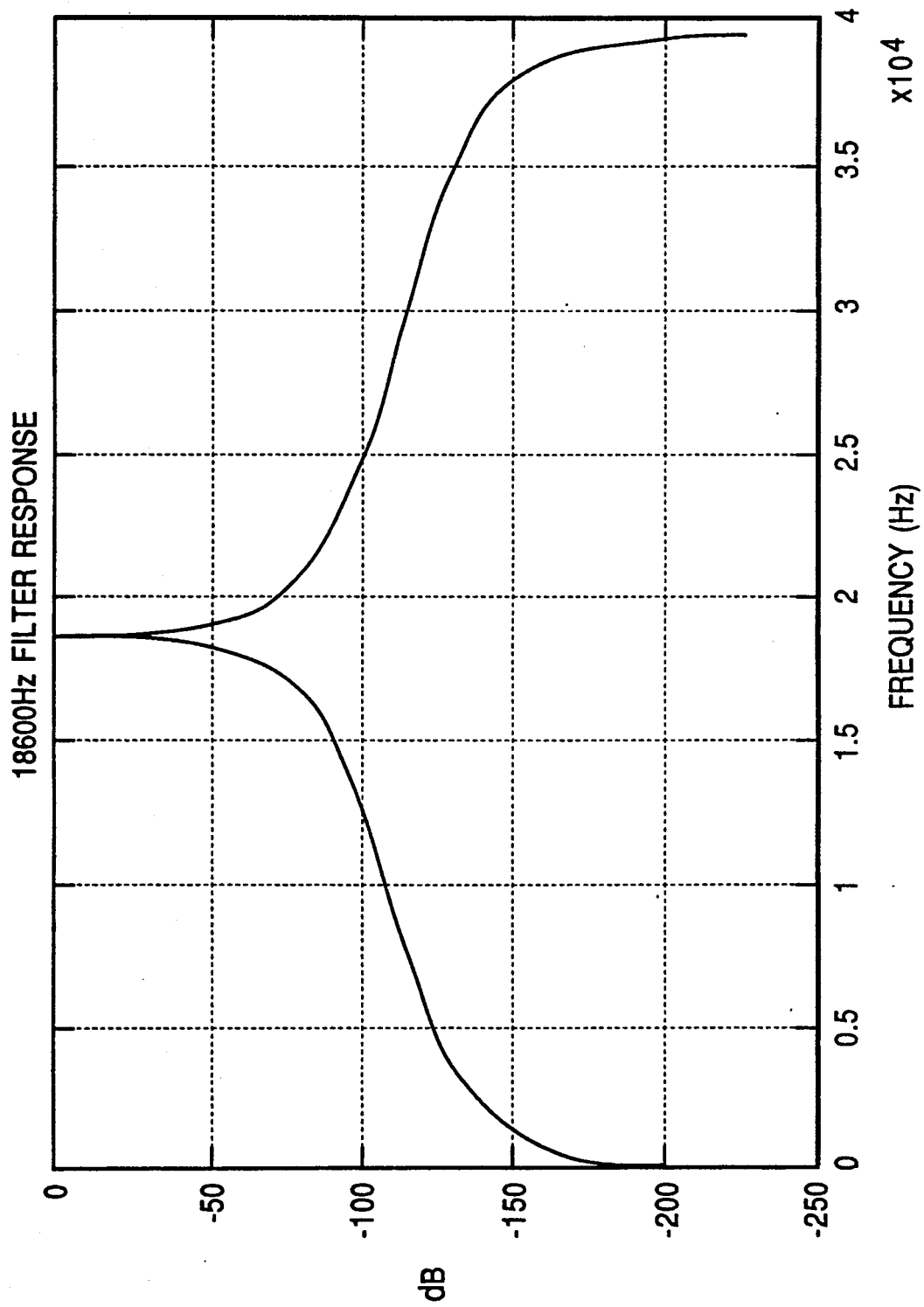
Figure 23:
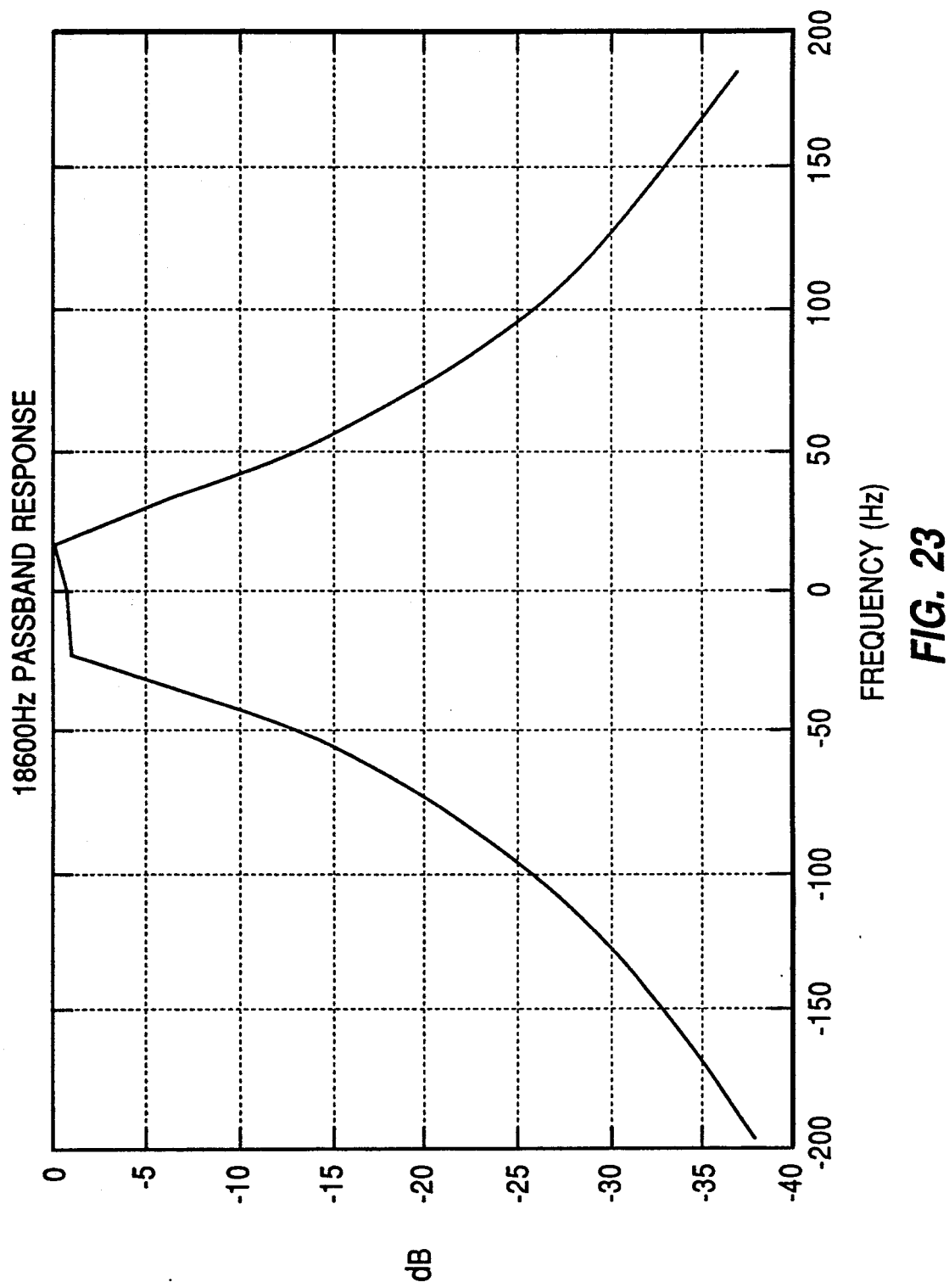

FIG. 22 illustrates the filter response when the receiver is in the passive mode at the radio narrowband frequency of 18,600 Hz. FIG. 23 illustrates the passband response in the selected mode at the selected frequency. FIG. 24 is a printout of the output of the MATLAB function showing the actual filter characteristics and coefficients in the selected mode at the selected frequency.

EXAMPLE 6

Figure 25:
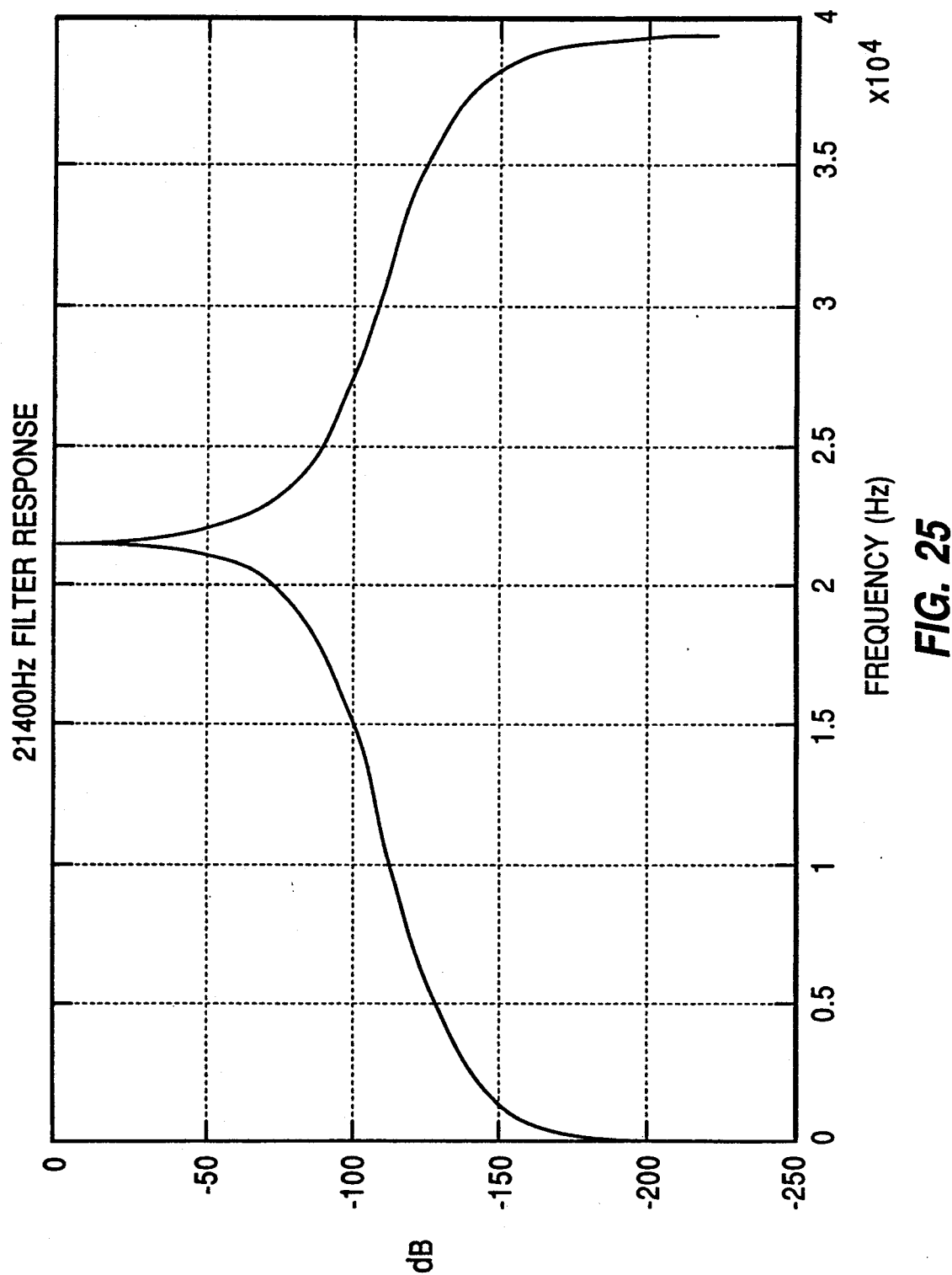
Figure 26:
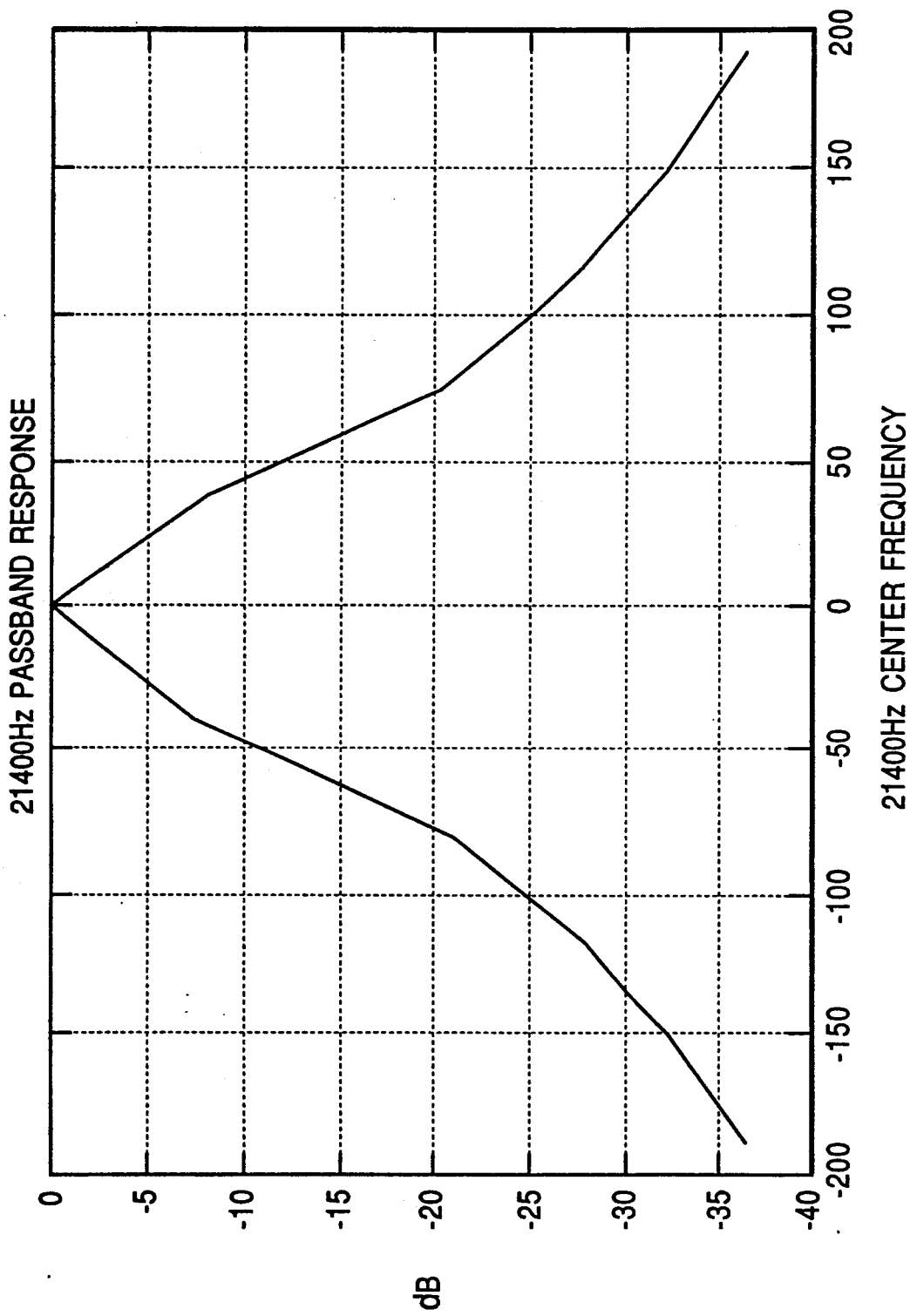

FIG. 25 illustrates the filter response when the receiver is in the passive mode at the radio narrowband frequency of 21,400 Hz. FIG. 26 illustrates the passband response in the selected mode at the selected frequency. FIGS. 27a and 27b are printouts of the output of the MATLAB function showing filter characteristics and coefficients in the selected mode at the selected frequency.

EXAMPLE 7

Figure 28:
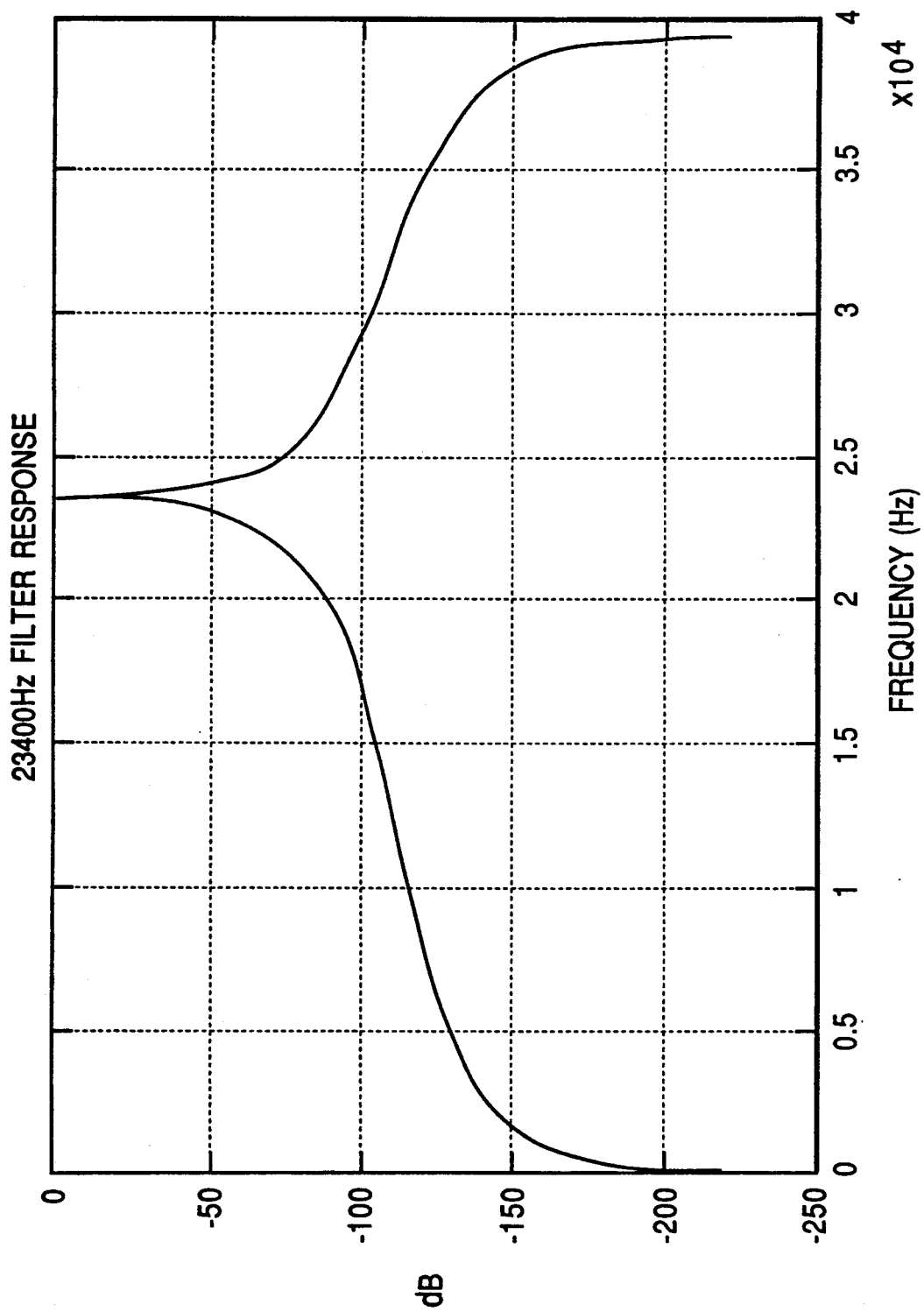
Figure 29:
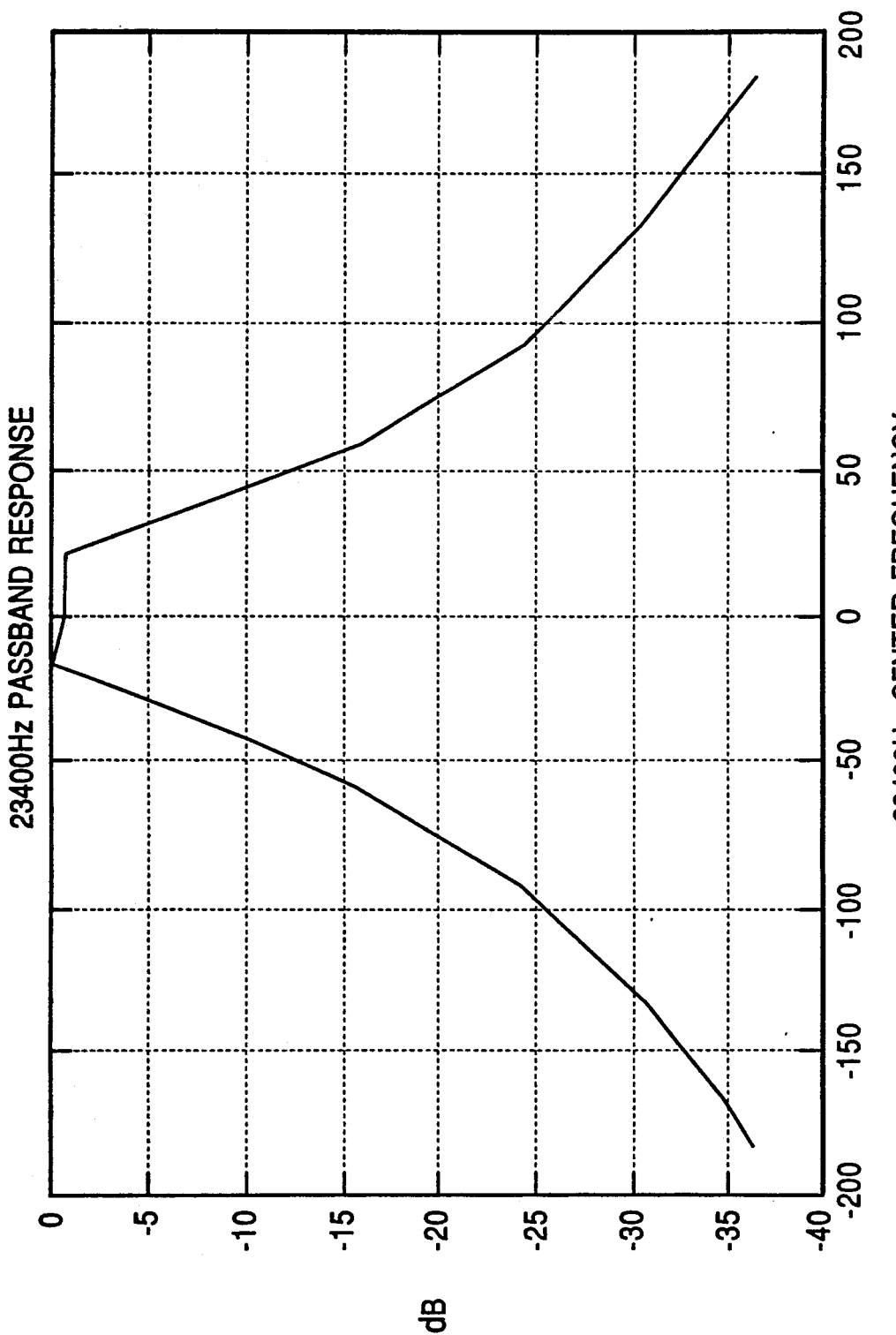

FIG. 28 illustrates the filter response when the receiver is in the passive mode at the radio narrowband frequency of 23,400 Hz. FIG. 29 illustrates the passband response in the selected mode at the selected frequency. FIGS. 30a and 30b are printouts of the output of the MATLAB function showing filter characteristics and coefficients in the selected mode at the selected frequency.

EXAMPLE 8

Figure 31:
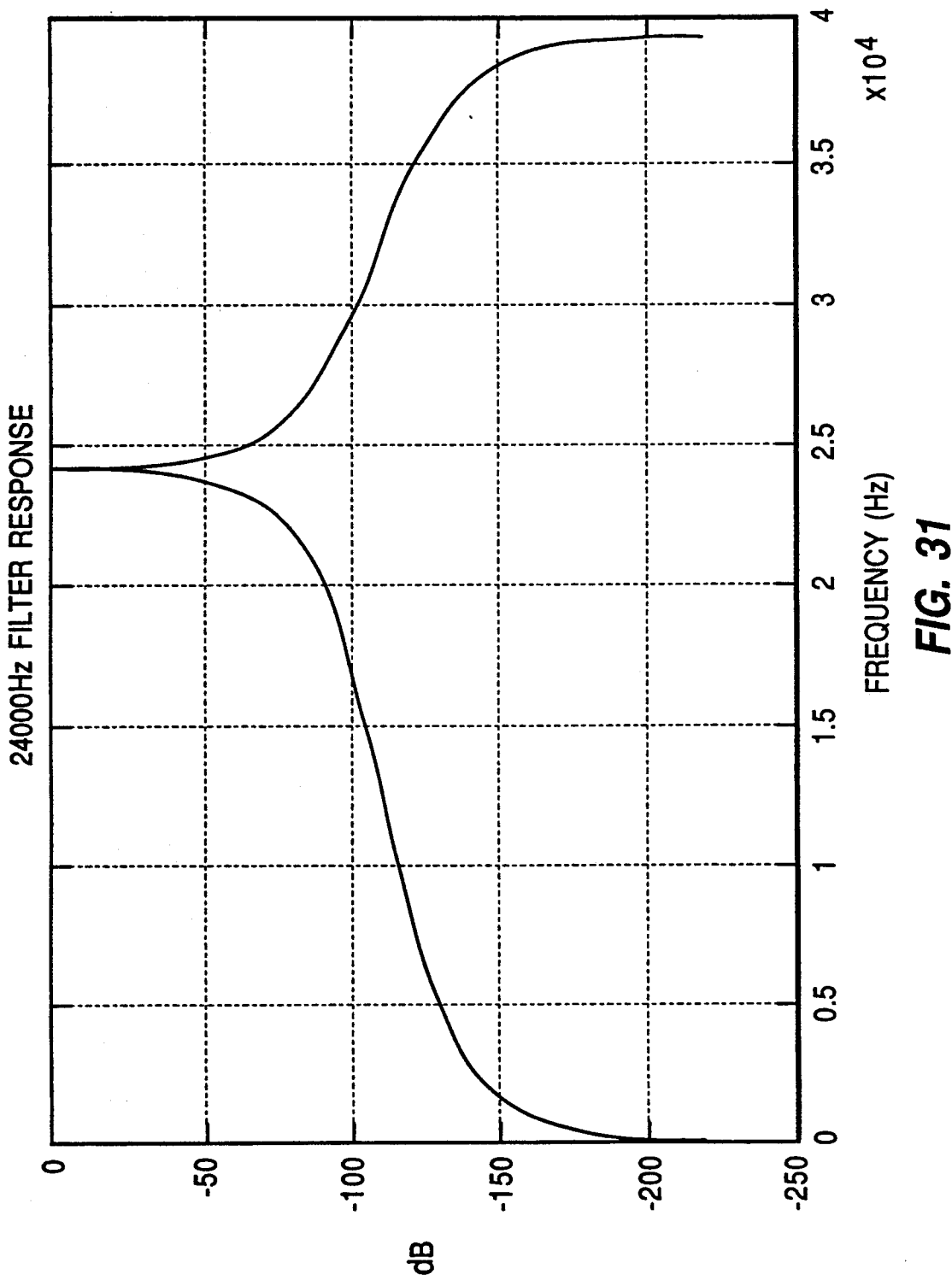
Figure 32:
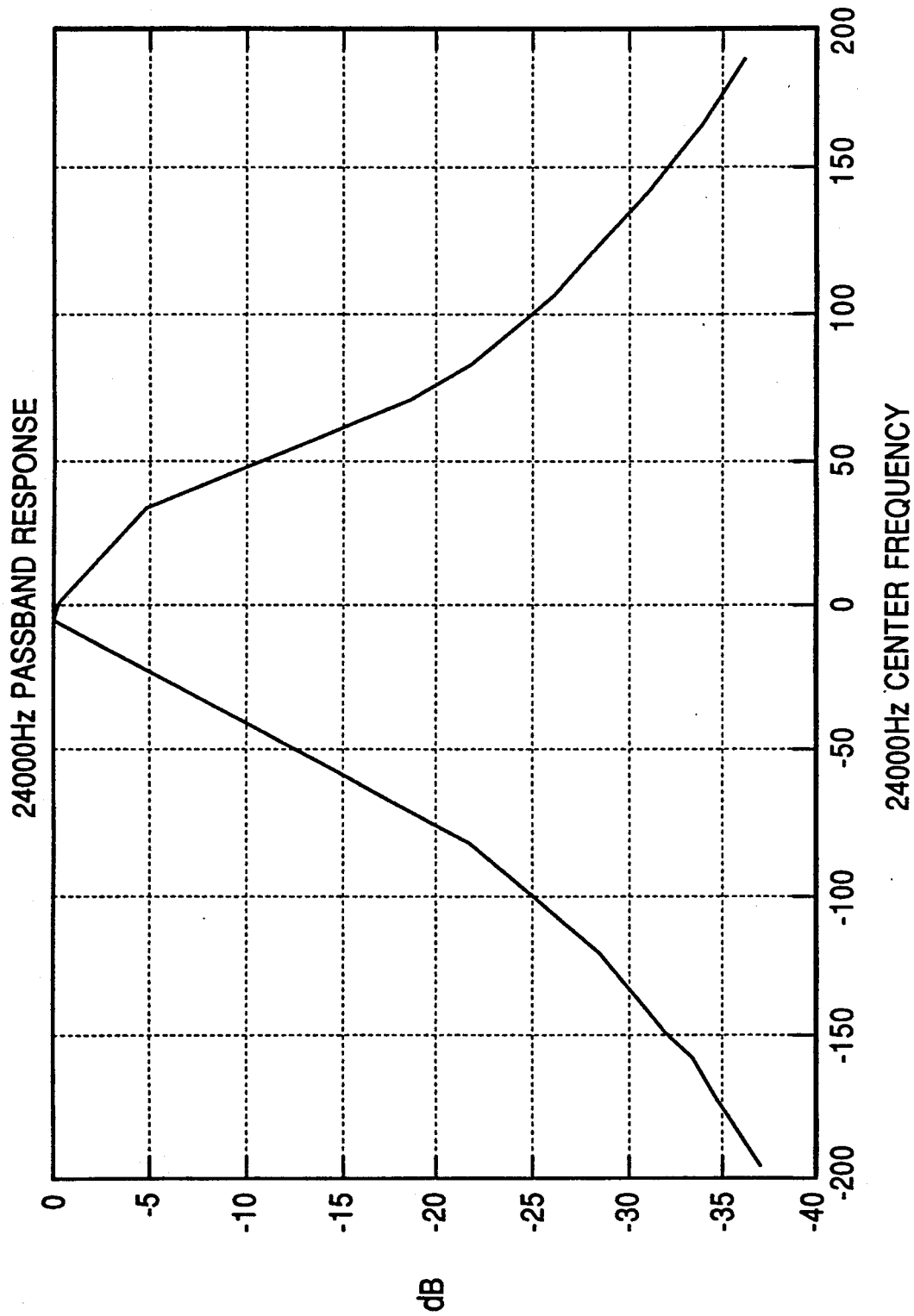

FIG. 31 illustrates the filter response when the receiver is in the passive mode at the radio narrowband frequency of 24,000 Hz. FIG. 32 illustrates the passband response in the selected mode at the selected frequency. FIG. 33a and 33b are printouts of the output of the MATLAB function showing filter characteristics and coefficients in the selected mode at the selected frequency.

EXAMPLE 9

Figure 34:
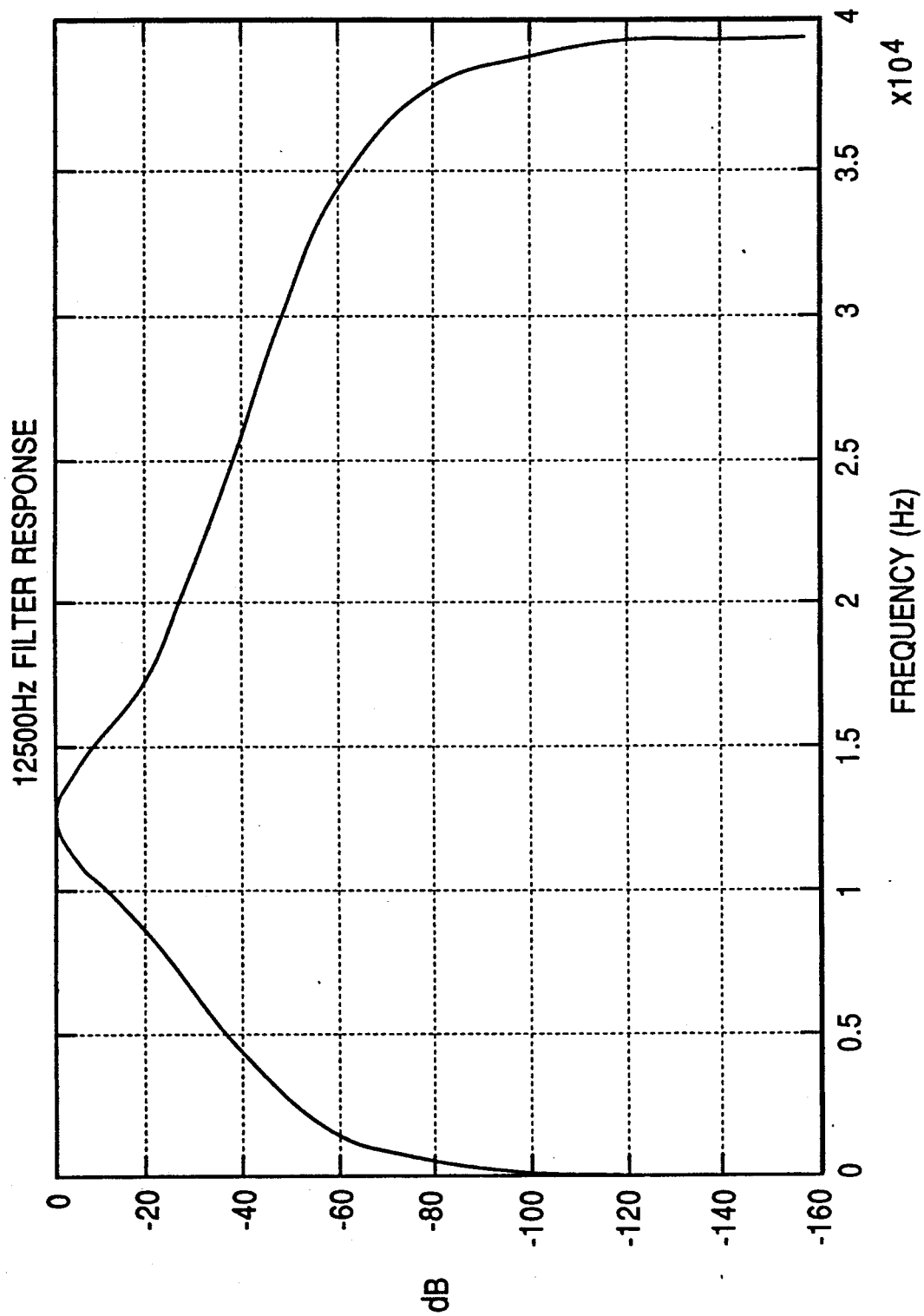
Figure 35:
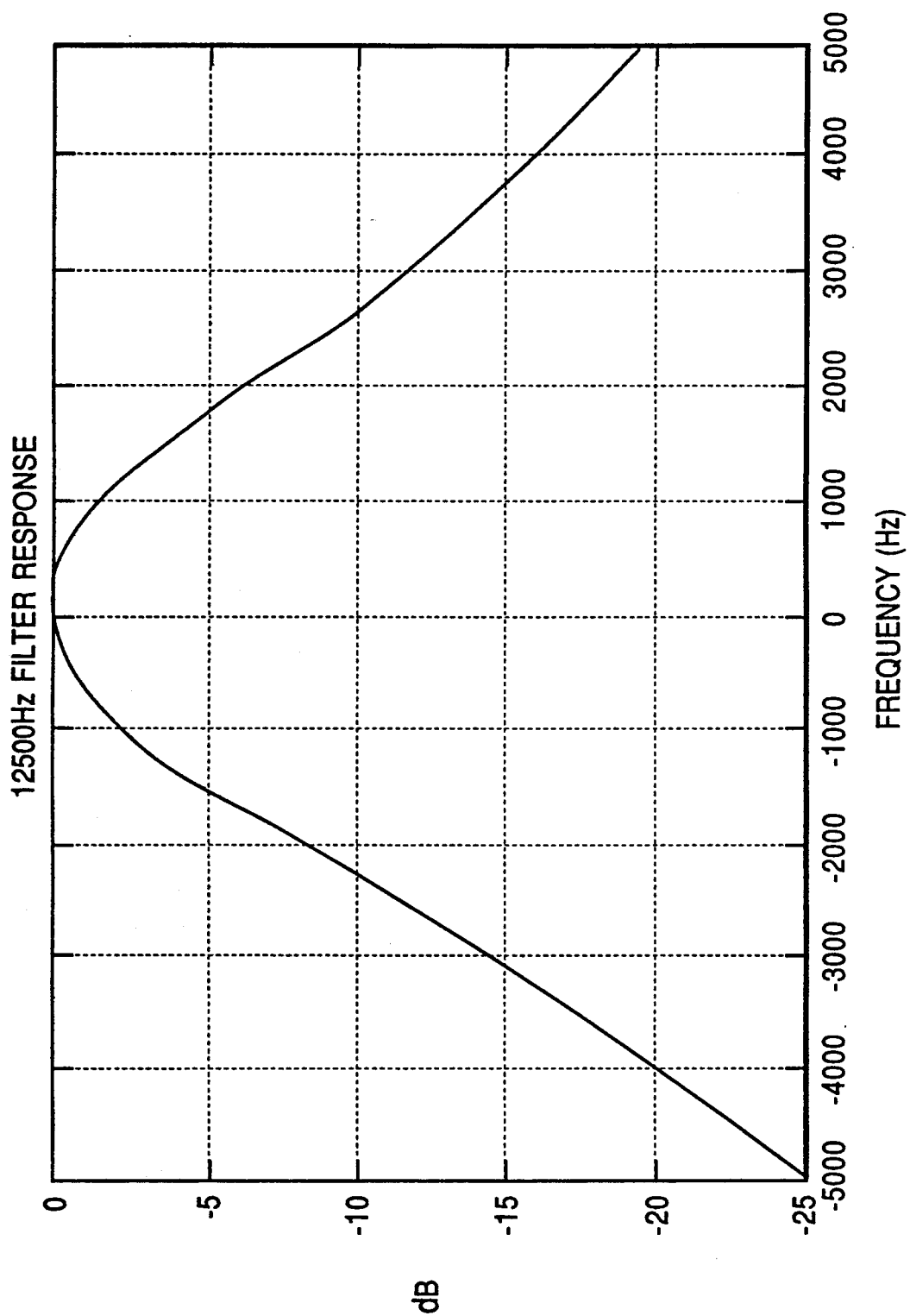

FIG. 34 illustrates the filter response when the receiver is in the passive mode at the radio wideband frequency of 12,500 Hz. It should be noted that 12,500 Hz. is the geometric center of the frequency band. FIG. 35 illustrates the passband response in the selected mode at the selected frequency. FIG. 36 is a printout of the output of the MATLAB function showing filter characteristics and coefficients in the selected mode at the selected frequency.

EXAMPLE 10.

Figure 37:
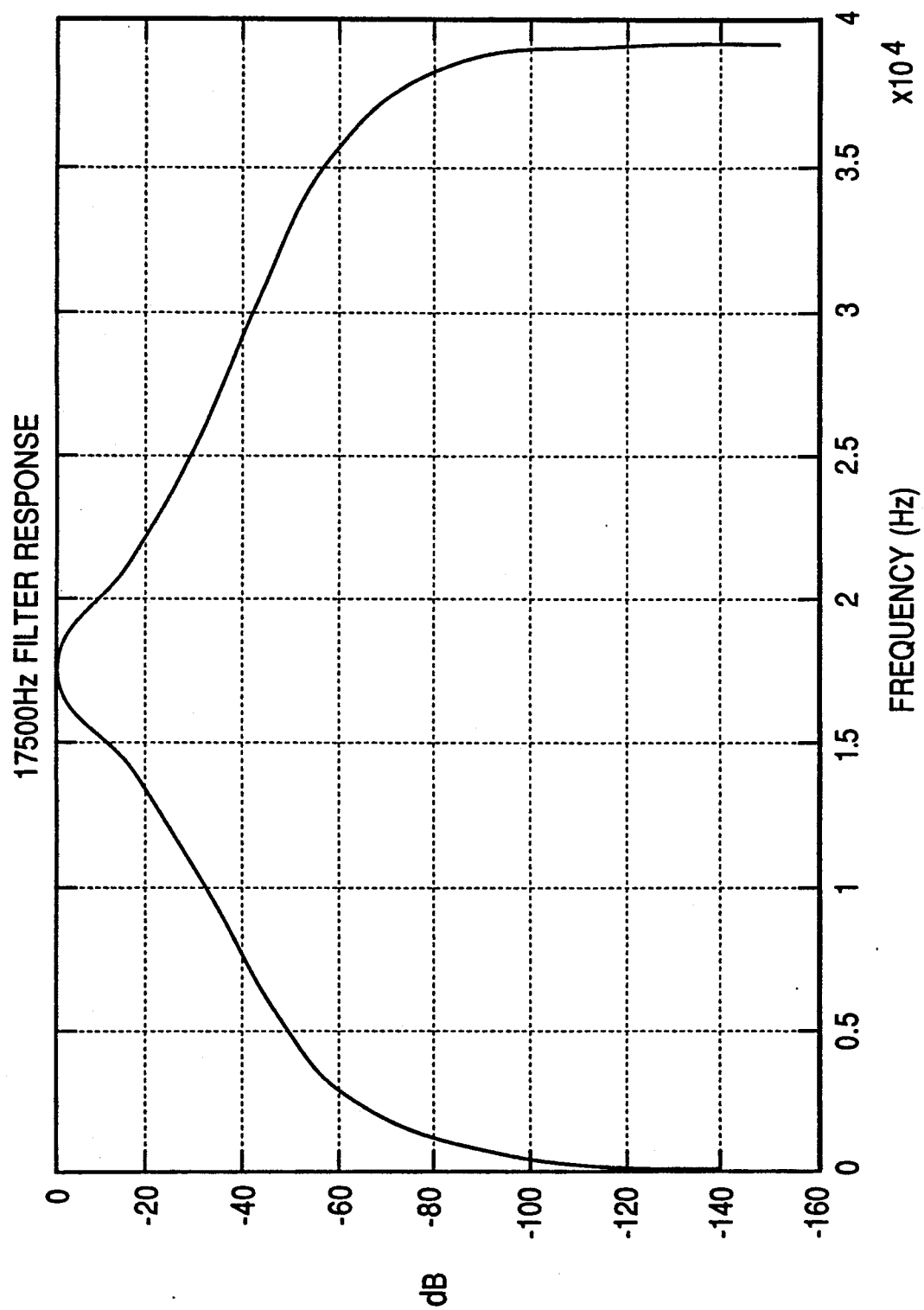
Figure 38:
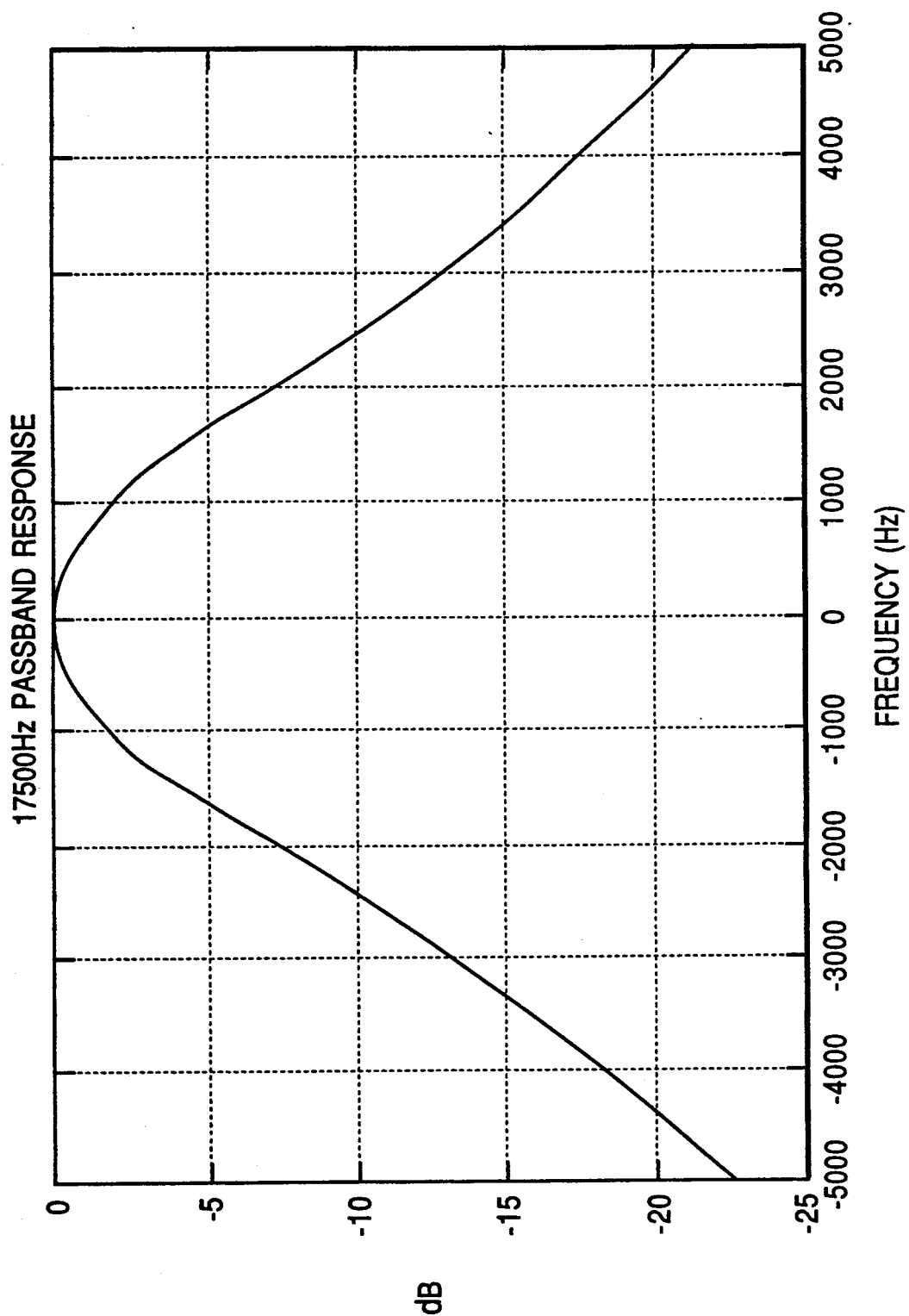

FIG. 37 illustrates the filter response when the receiver is in the passive mode at the radio wideband frequency of 17,500 Hz. FIG. 38 illustrates the passband response in the selected mode at the selected frequency. FIG. 39 is a printout of the output of the MATLAB function showing filter characteristics and coefficients in the selected mode at the selected frequency.

EXAMPLE 11

Figure 40:
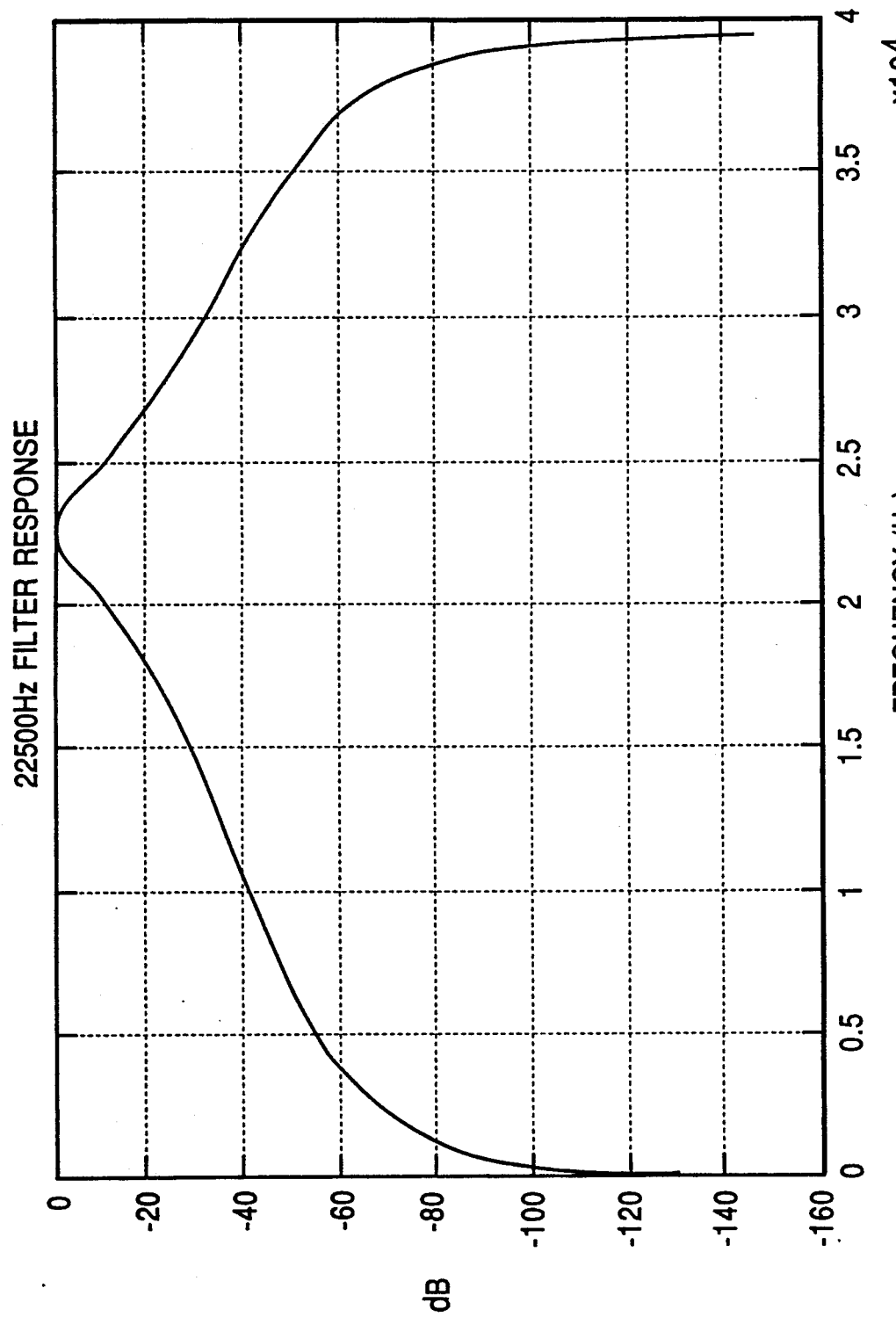
Figure 41:
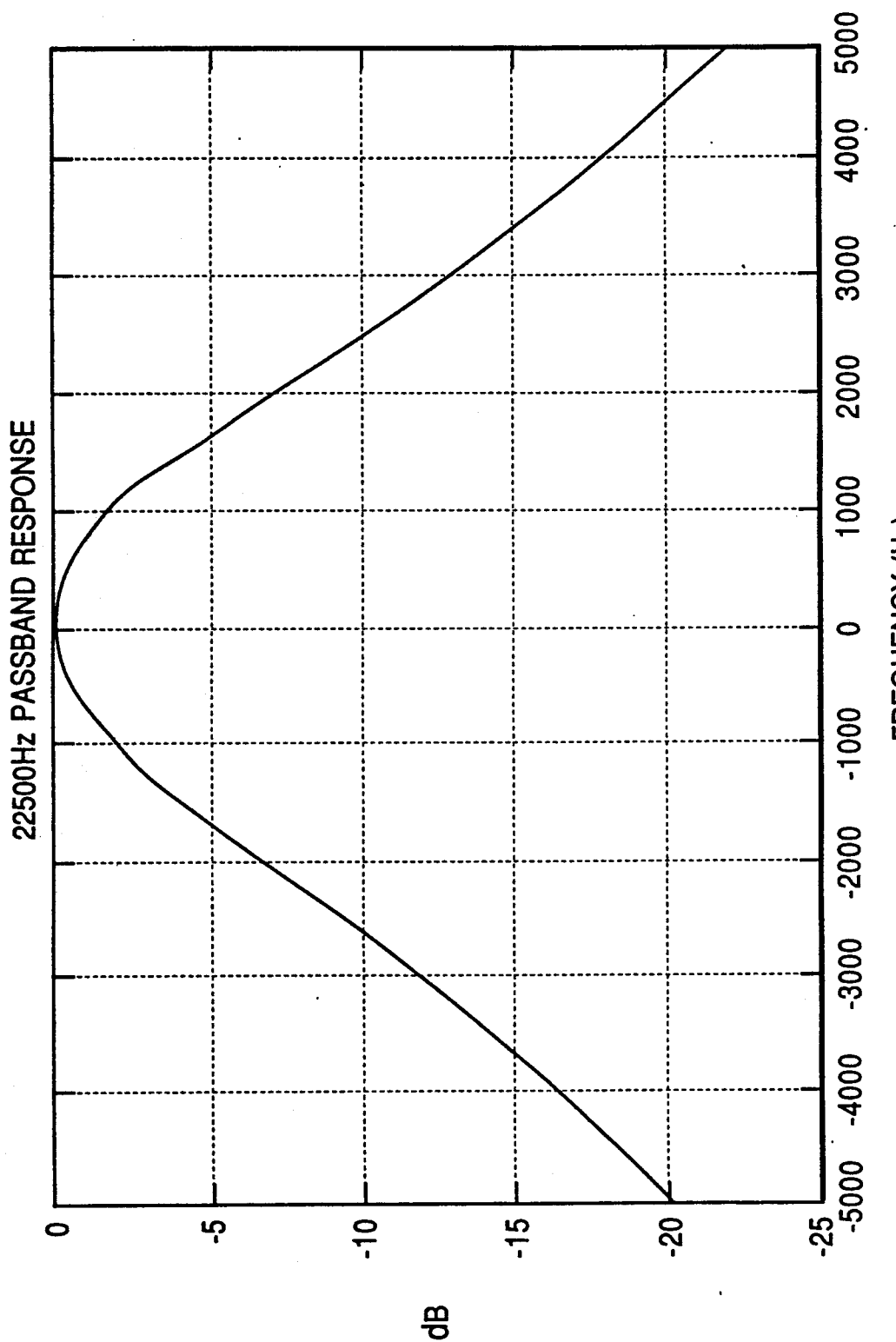

FIG. 40 illustrates the filter response when the receiver is in the passive mode at the radio wideband frequency of 22,500 Hz. FIG. 41 illustrates the passband response in the selected mode at the selected frequency. FIG. 42 is a printout of the output of the MATLAB function showing filter characteristics and coefficients in the selected mode at the selected frequency.

EXAMPLE 12

Figure 43:
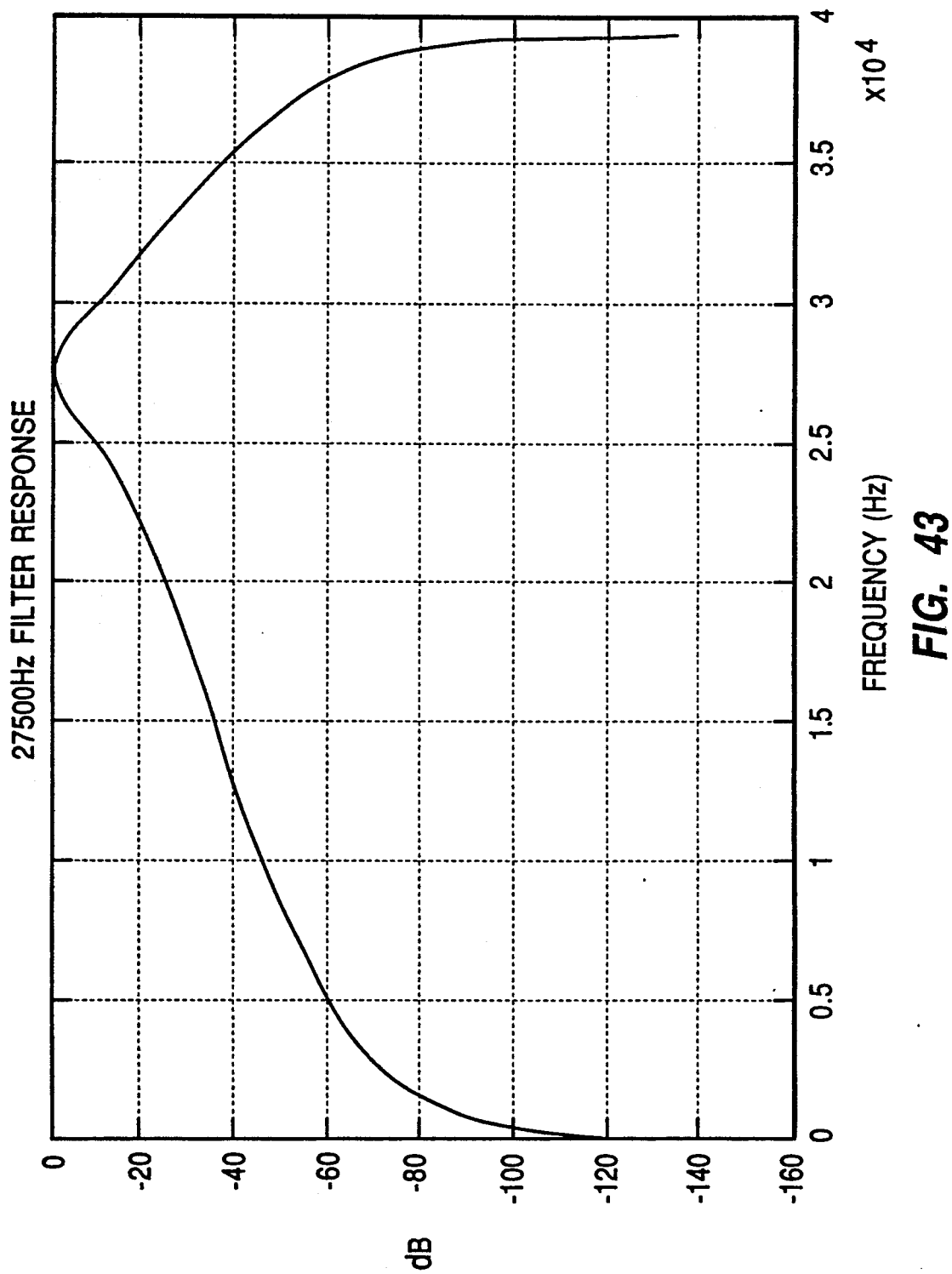
Figure 44:
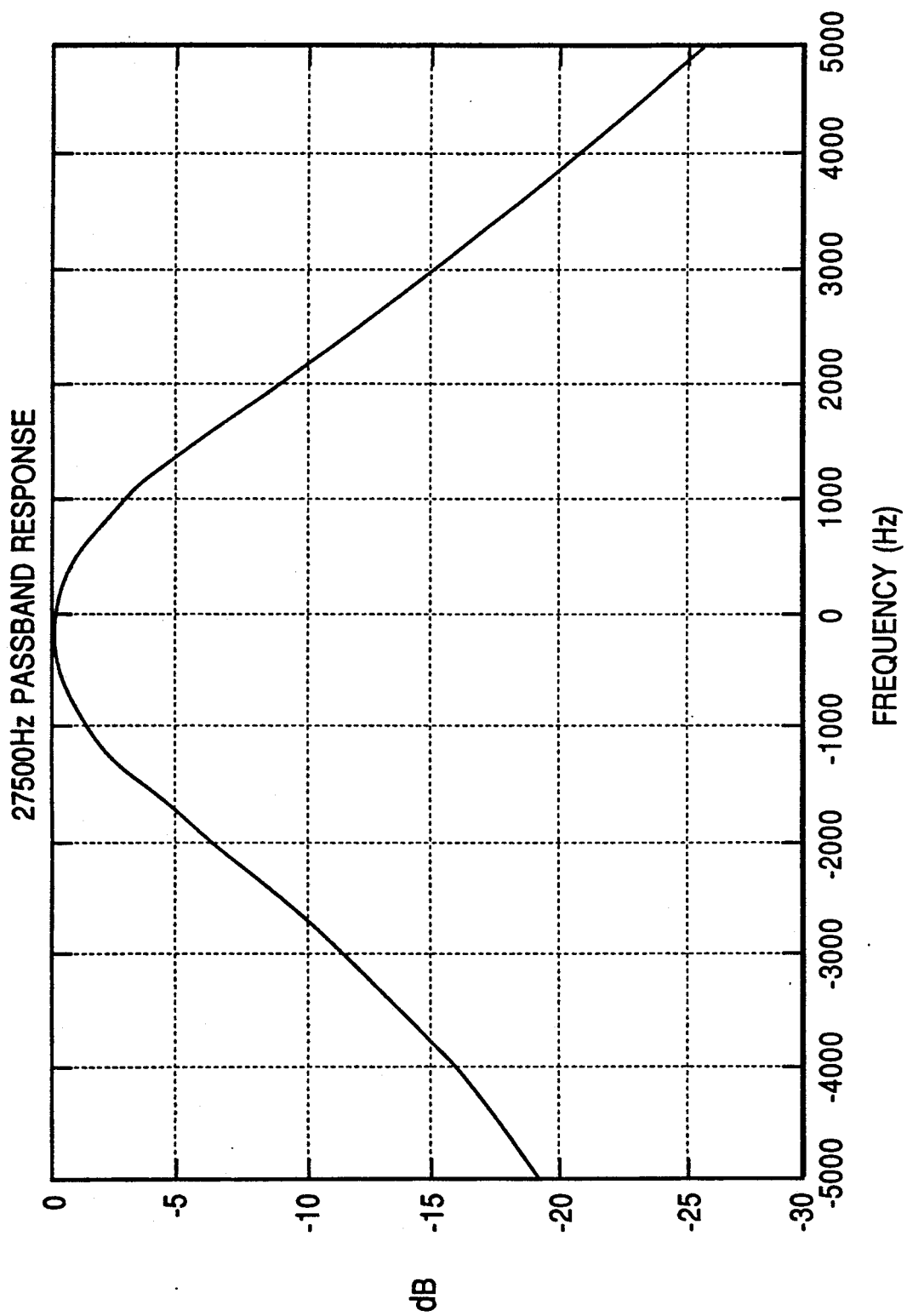

FIG. 43 illustrates the filter response when the receiver is in the passive mode at the radio wideband frequency of 27,500 Hz. FIG. 44 illustrates the passband response in the selected mode at the selected frequency. FIG. 45 is a printout of the output of the MATLAB function showing filter characteristics and coefficients in the selected mode at the selected frequency.

EXAMPLE 13

Figure 46:
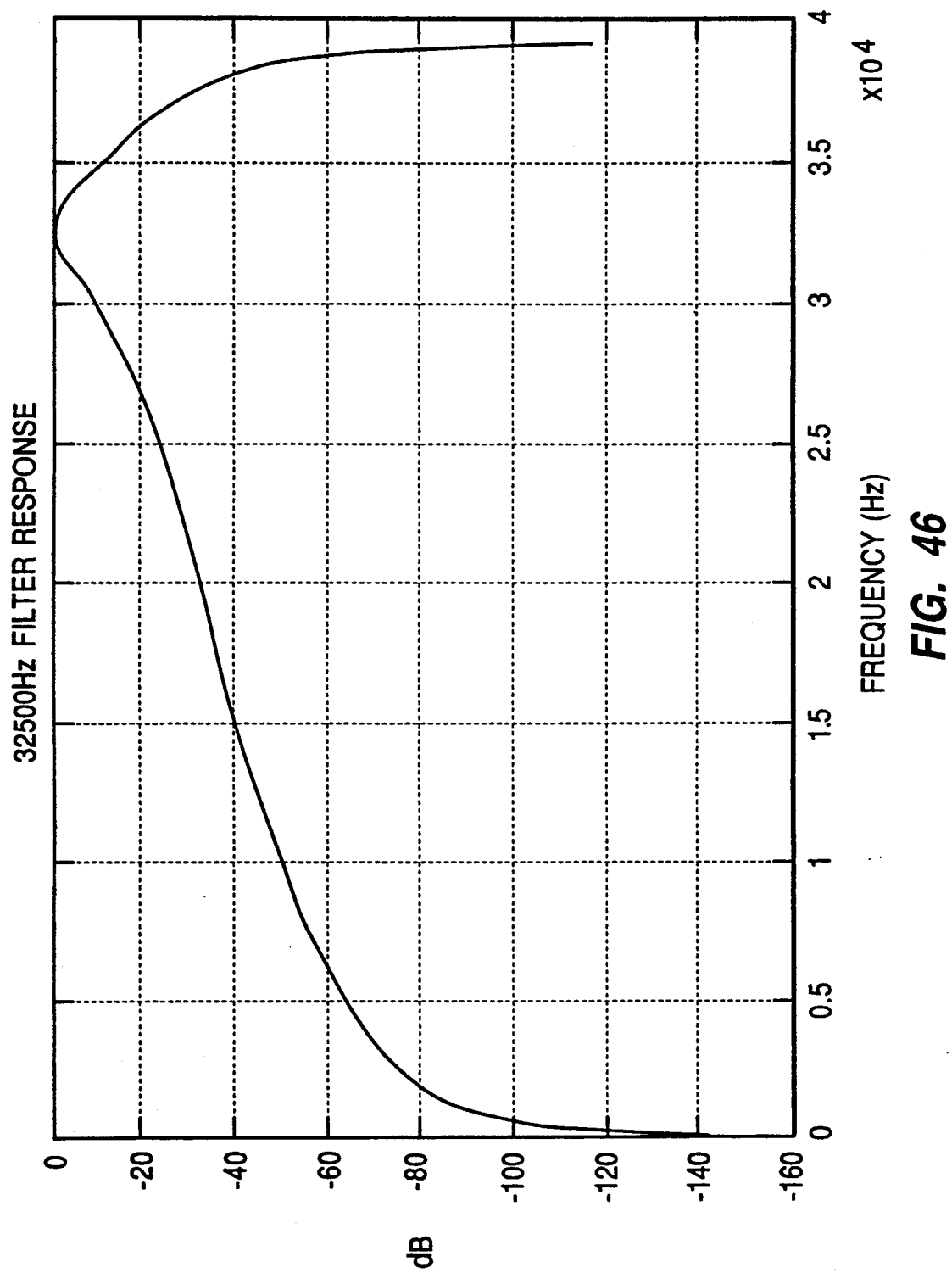
Figure 47:
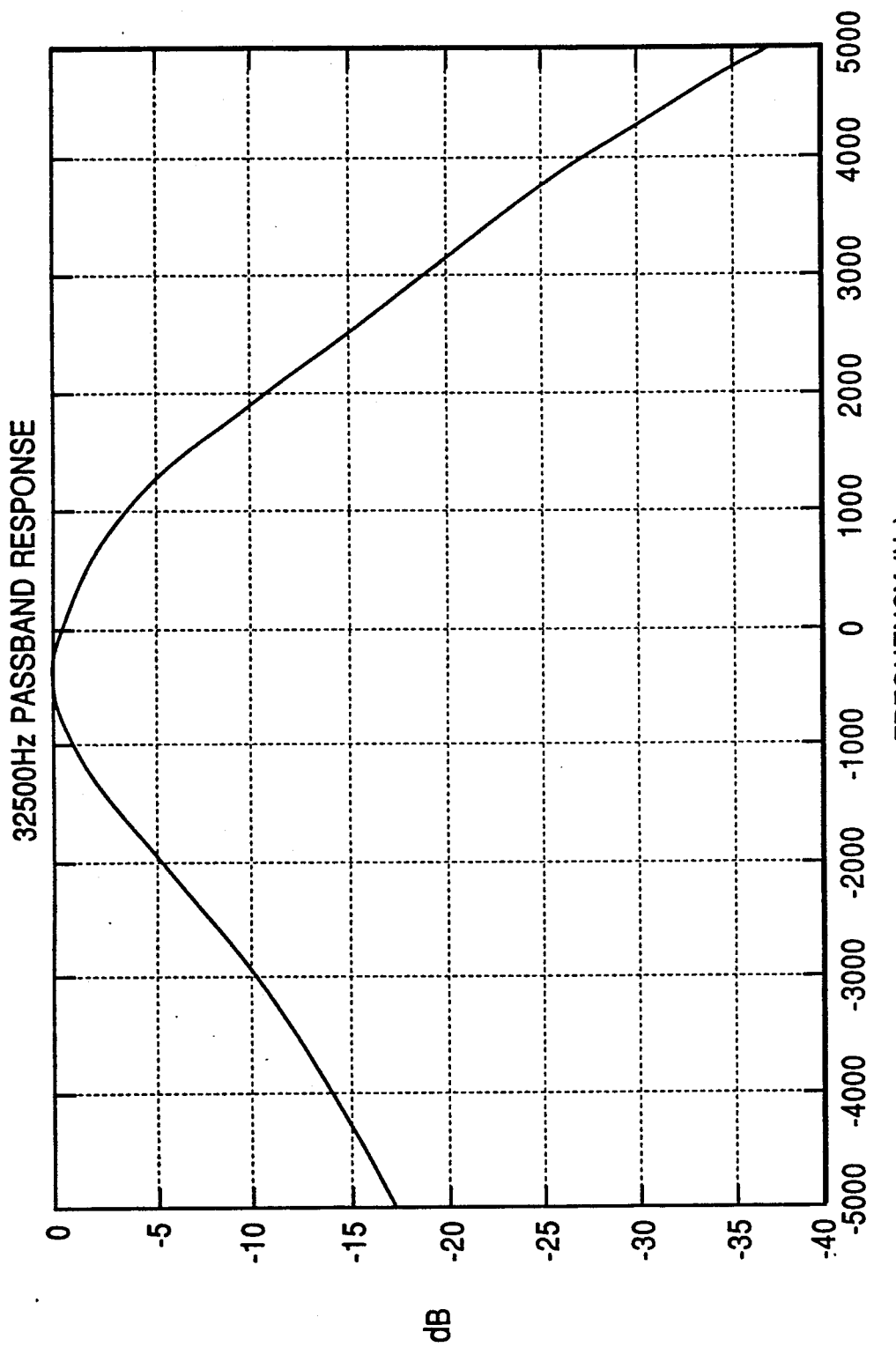

FIG. 46 illustrates the filter response when the receiver is in the passive mode at the radio wideband frequency of 32,500 Hz. FIG. 47 illustrates the passband response in the selected mode at the selected frequency. FIG. 48 is a printout of the output of the MATLAB function showing filter characteristics and coefficients in the selected mode at the selected frequency.

EXAMPLE 14

Figure 49:
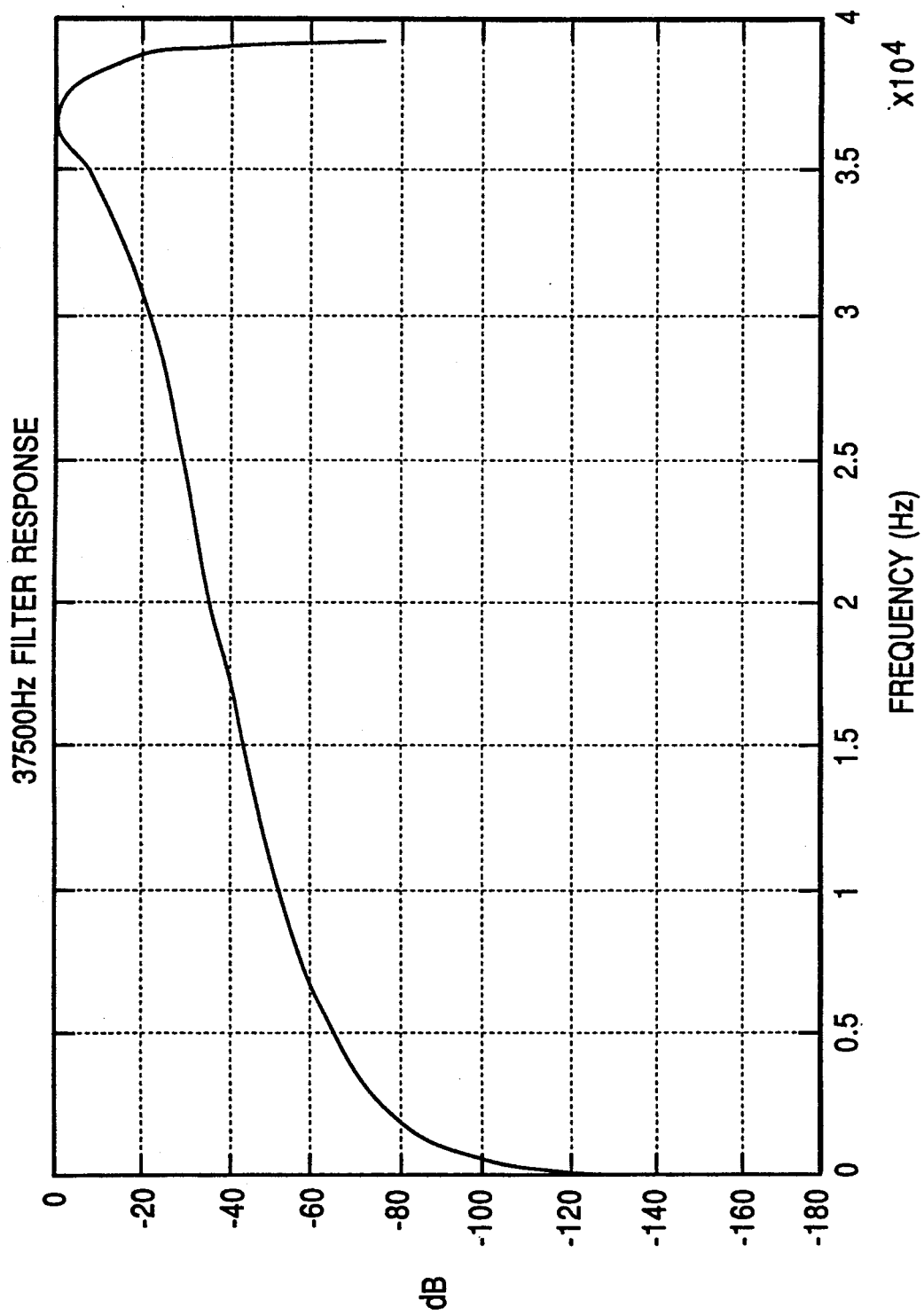
Figure 50:
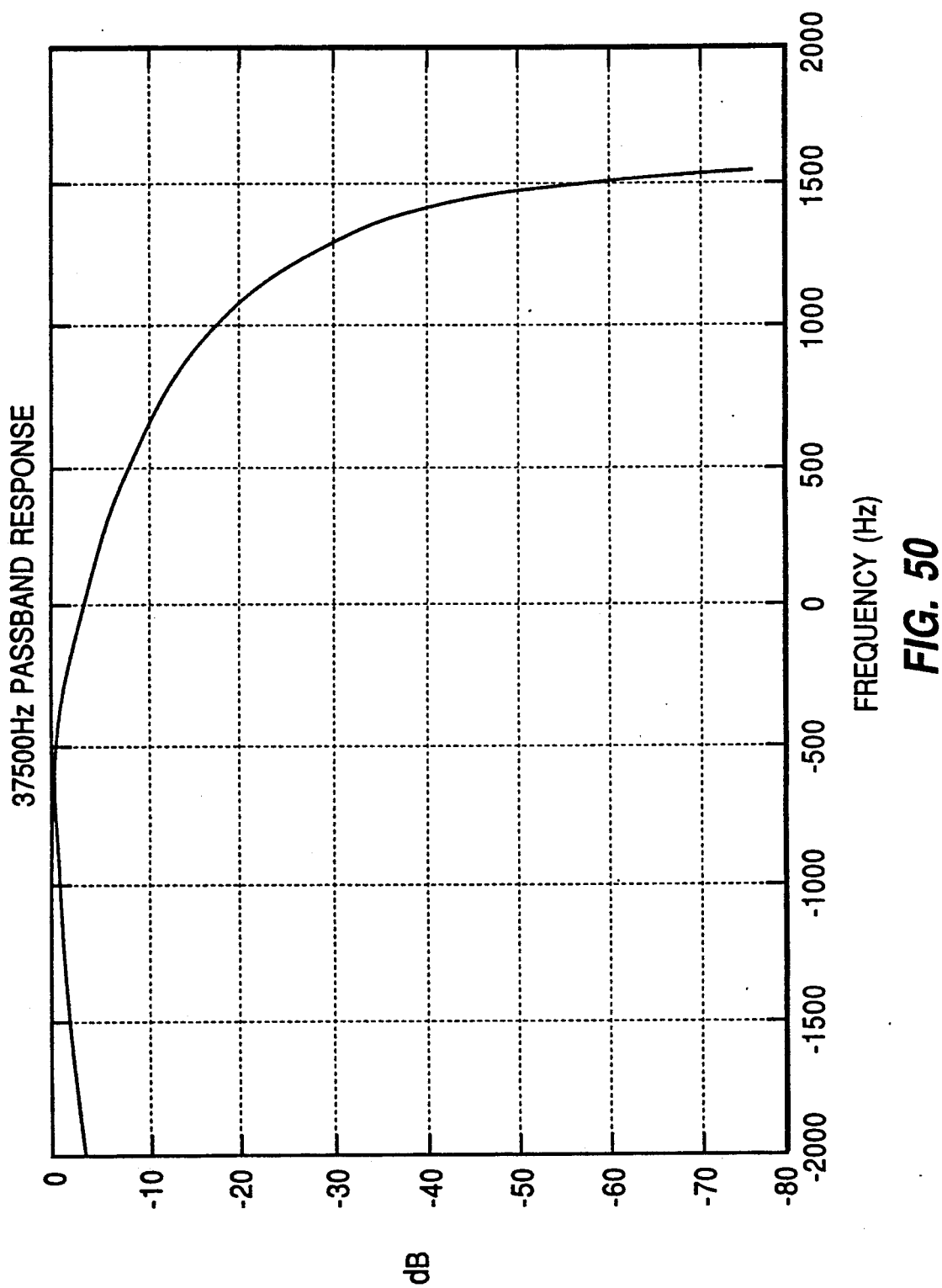

FIG. 49 illustrates the filter response when the receiver is in the passive mode at the radio wideband frequency of 37,500 Hz. FIG. 50 illustrates the passband response in the selected mode at the selected frequency. FIG. 51 is a printout of the output of the MATLAB function showing filter characteristics and coefficients in the selected mode at the selected frequency.

Three examples are now provided of the receiver's operation in the active mode. However, in the next three examples, only a passband response and MATLAB printout is provided.

EXAMPLE 15

Figure 52:
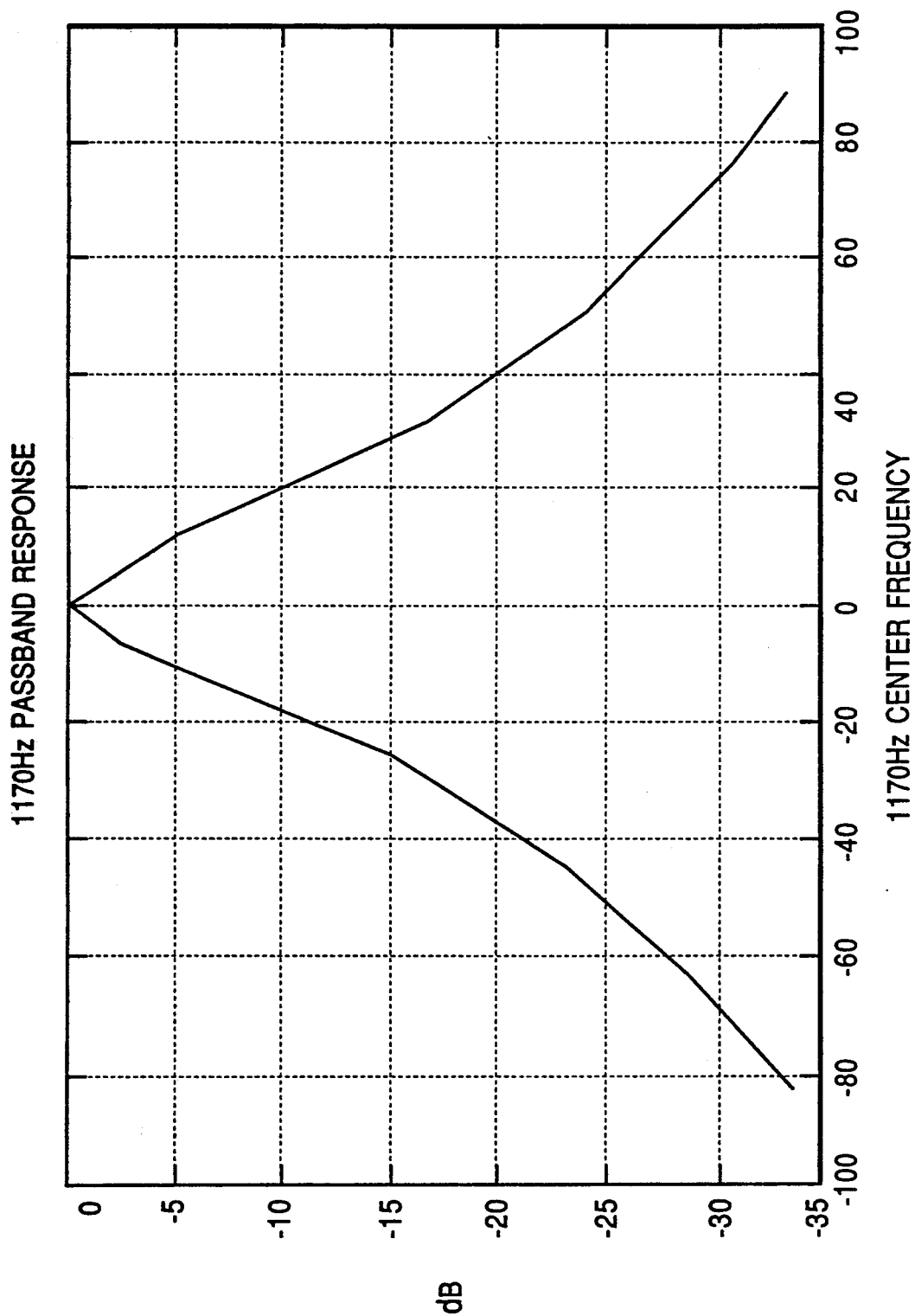

FIG. 52 illustrates the passband response when the receiver is in the active mode tuned to a frequency of 1,170 Hz. FIG. 53 is a printout of the output of the MATLAB function showing filter characteristics and coefficients in the selected mode at the selected frequency.

EXAMPLE 16

Figure 54:
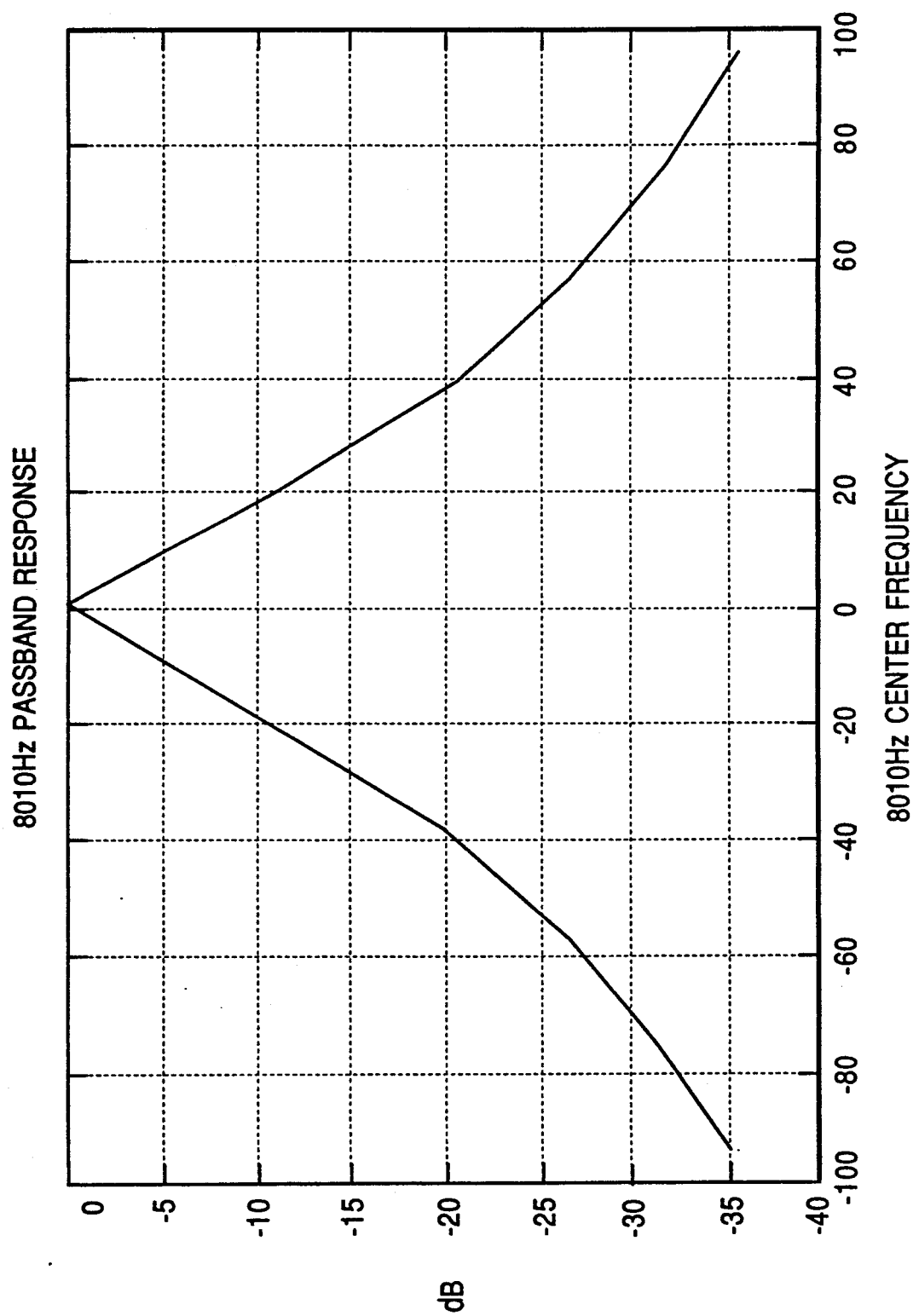

FIG. 54 illustrates the passband response when the receiver is in the active mode tuned to a frequency of 8,010 Hz. FIG. 55 is a printout of the output of the MATLAB function showing filter characteristics and coefficients in the selected mode at the selected frequency.

EXAMPLE 17

Figure 56:
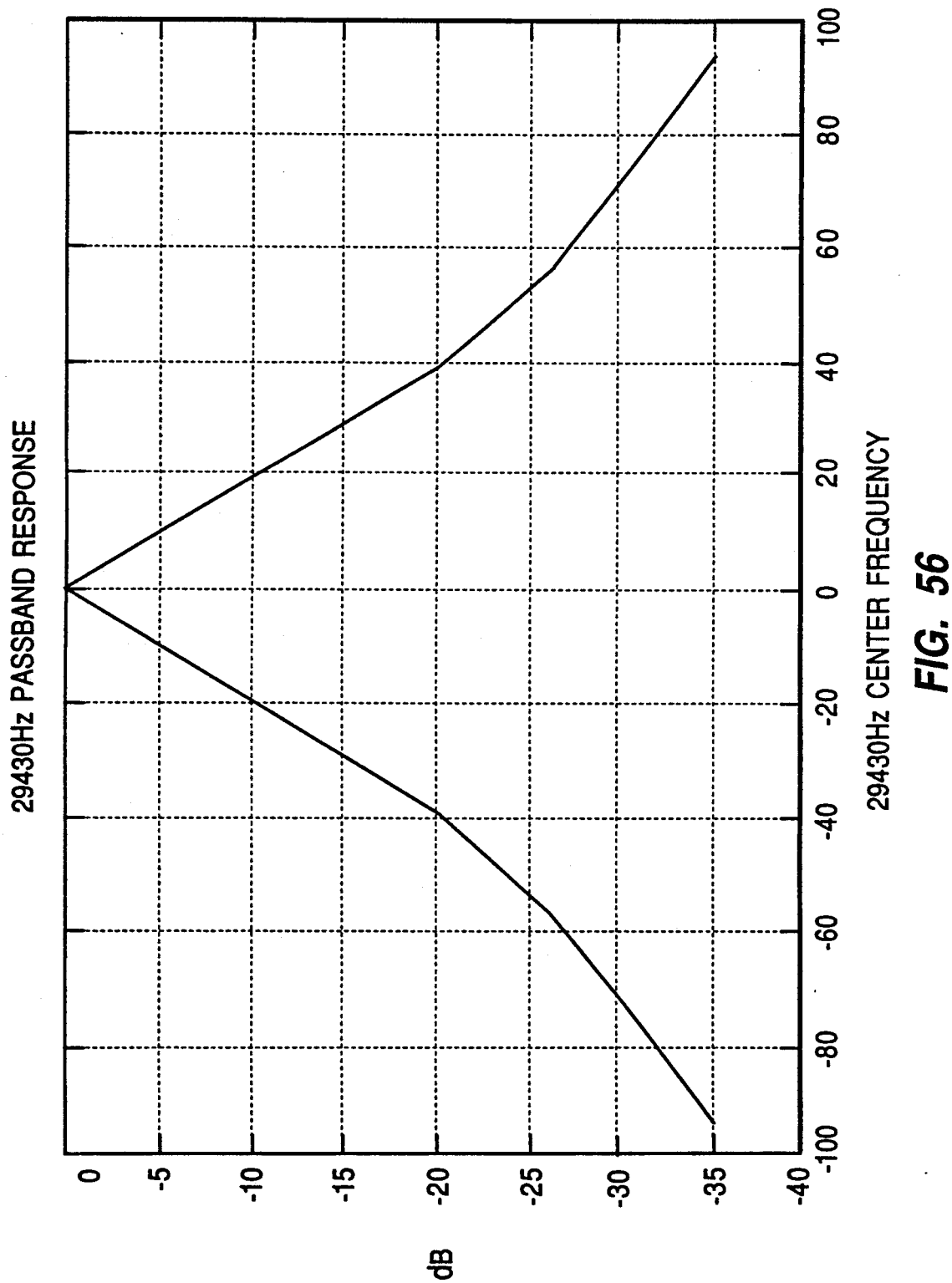

FIG. 56 illustrates the passband response when the receiver is in the active mode tuned to a frequency of 29,430 Hz. FIG. 57 is a printout of the output of the MATLAB function showing filter characteristics and coefficients in the selected mode at the selected frequency.

It should be noted that in certain of the example plots the peak of the response appears truncated. This is apparent in FIG. 14, among others. However, this is solely due to sampling inadequacies in plotting the graphs. The actual response would have a clearly defined peak, as shown by, for example, FIGS. 26 and 52.

While the invention has been described in detail, including many examples, it should be construed as being limited only by the appended claims. Various changes and modifications are possible which fall within the scope and spirit of the invention, and the invention should be construed to include those various changes and modifications.

We claim:

1. A system for locating a concealed object comprising:
    transmitting means for transmitting an electromagnetic signal from said concealed object; and
    receiving and processing means for receiving and processing said electromagnetic signal, said receiving and processing means including
        antenna means for receiving said electromagnetic signal as an analog signal;
        amplifying means for amplifying said received analog signal;
        analog-to-digital converter means for converting said amplified analog signal to a digital signal, said analog-to-digital converter means sampling said amplified analog signal at a predetermined frequency;
        digital filter means for filtering said digital signal, said digital filter means including a two-stage digital filter, the filter characteristics of said first stage of said two-stage digital filter being defined by parameters AO11 and AO12, and the filter characteristics of said second stage of said two-stage digital filter being defined by parameters AO21 and AO22, wherein $$AOx1 = 2*(1-1/q) *\cos (2*pi*fctr/fsmpl)*16384$$

and $$AOx2 = -(1-1/q)^2 * 32768,$$

wherein
q = quality factor,
fctr = center frequency,
fsmpl = sampling frequency, and
x = 1 or 2; and
processing means for processing said filtered digital signal to provide an output signal indicative of the location of said concealed object.

2. A system for locating a concealed object according to claim 1 wherein said antenna means comprises a plurality of antennae, and said amplifying means amplifies the signal received by each antenna individually.

3. A system for locating a concealed object according to claim 2 further comprising selecting means for selecting the amplified signal from any one of said plurality of antennae or a combination thereof.

4. A system for locating a concealed object according to claim 1 wherein said locating system further comprises audio means for accepting said output signal and giving an audible indication of the information contained therein.

5. A system for locating a concealed object according to claim 4 wherein said each of the stages of said two-stage digital filter is a second-order digital filter.

6. A system for locating a concealed object according to claim 1 wherein said analog-to-digital converter samples said amplified analog signal at a frequency of 78,125 samples per second.

7. A system for locating a concealed object according to claim 1 wherein said locating system further comprises display means for accepting said output signal and displaying information contained therein.

8. A system for locating a concealed object according to claim 4 wherein said information comprises the strength of said received electromagnetic signal.

9. A system for locating a concealed object according to claim 1 wherein said locating system includes input means for controlling said processing means and said digital filter means.

10. A system for locating a concealed object according to claim 9 wherein said input means includes a keyboard.

11. A system for locating a concealed object according to claim 1 wherein said transmitting means transmits said electromagnetic signal at a frequency of 1,170 Hz, 8,010 Hz or 29,430 Hz.

12. A method of selecting a two-stage digital filter for use in a locating system including means for receiving a signal radiated from a concealed object as an analog signal, means for amplifying the received analog signal, means for converting the amplified analog signal to a digital signal, and a two-stage digital filter for filtering said digital signal, the means for converting said amplified analog signal to a digital signal sampling the amplified analog signal at a predetermined frequency, wherein the characteristics of said two-stage digital filter are defined by coefficients AO11, AO12, AO21 and AO22, the method comprising:

calculating said coefficients AO11, AO12, AO21 and AO22 according to the following formulae:

$$AOx1 = 2*(1-1/q) * \cos(2*pi*fctr/fsmpl)*16384$$

and $$AOx2 = -(1-1/q)^2 * 32768$$

wherein
q = quality factor
fctr = center frequency
fsmpl = sampling frequency, and
x = 1 or 2; and performing a stabilization analysis of the digital filter defined by said coefficients.

13. A method of selecting a two-stage digital filter according to claim 12 wherein said step of performing a stabilization analysis of the digital filter defined by said coefficients comprises plotting the impulse response of said digital filter.

14. A method of selecting a two-stage digital filter according to claim 13 wherein said step of performing a stabilization analysis of said digital filter further comprises examining the plot of the impulse response of said digital filter to determine the length of time required for said digital filter to stabilize.

15. A method of selecting a two-stage digital filter according to claim 14 wherein said step of performing a stabilization analysis of said digital filter further comprises determining whether the length of time required for said digital filter to stabilize is sufficiently short to meet designed requirements.

16. A receiver for receiving an electromagnetic signal radiated by a concealed object to indicate the location of said concealed object comprising:
a. antenna means for receiving said electromagnetic signal as an analog signal;
b. amplifying means for amplifying said analog signal;
c. analog-to-digital converter means for converting said amplified analog signal to a digital signal, said analog-to-digital converter means sampling said amplified analog signal at a predetermined frequency;
d. digital filter means for filtering said digital signal, said digital filter means including a two-stage digital filter, the filter characteristics of the first stage of said two-stage digital filter being defined by parameters AO11 and AO12, and the filter characteristics of the second stage of said two-stage digital filter being defined by parameters AO21 and AO22 wherein $$AOx1 = 2*(1-1/q) * \cos(2*pi*fctr/fsmpl)*16384$$

and $$AOx2 = -(1-1/q)^2 * 32768,$$

wherein
q = quality factor,
fctr = center frequency,
fsmpl = sampling frequency, and
x = 1 or 2; and
e. processing means for processing said filtered digital signal to indicate the location of said concealed object.

17. A receiver according to claim 16 wherein said antenna means comprises a plurality of antennae, and said amplifying means amplifies the signal received by each antenna individually.

18. A receiver according to claim 17 further comprising selecting means for selecting the amplified signal from any one of said plurality of antennae or a combination thereof.

19. A receiver according to claim 16 wherein said each of the stages of said two-stage digital filter is a second-order digital filter.

20. A receiver according to claim 16 wherein said analog-to-digital converting means samples said amplified analog signal at a frequency of 78,125 samples per second.

21. A receiver according to claim 16 wherein said processing means provides an output signal indicative of the location of the concealed object.

22. A receiver according to claim 21 wherein said receiver further comprises display means for accepting said output signal and displaying the information contained therein.

23. A receiver according to claim 22 wherein said information comprises the strength of the received electromagnetic signal.

24. A receiver according to claim 21 wherein said receiver further comprises audio means for accepting said output signal and providing an audible indication of the information contained therein.

25. A receiver according to claim 24 wherein said information comprises the strength of the received electromagnetic signal.

26. A receiver according to claim 16 wherein said receiver includes input means for controlling said processing means and said digital filter means.

27. A receiver according to claim 26 wherein said input means includes a keyboard.

* * * * *